United States Patent [19]
Yokota et al.

[11] Patent Number: 4,912,565
[45] Date of Patent: Mar. 27, 1990

[54] METHOD OF AND APPARATUS FOR RECORDING IMAGE IN THE FORM OF PIXEL ARRAY

[75] Inventors: Akihiro Yokota; Fumihiro Hatayama, both of Kyoto, Japan

[73] Assignee: Dainippon Screen Mfg. Co., Ltd., Japan

[21] Appl. No.: 282,442

[22] Filed: Dec. 9, 1988

[30] Foreign Application Priority Data

Dec. 10, 1987 [JP] Japan .................................. 62-313716

[51] Int. Cl.$^4$ ............................................ H04M 1/40
[52] U.S. Cl. ....................................... 359/447; 382/54
[58] Field of Search ..................... 358/447, 448, 463; 382/49, 54

[56] References Cited

U.S. PATENT DOCUMENTS 4,517,607  5/1986  Ohkouchi et al. .................. 358/447
4,646,355  2/1987  Petrick et al. .......................... 382/54
4,782,399  11/1988  Sato ..................................... 358/447

FOREIGN PATENT DOCUMENTS 62-183263  8/1987  Japan .

Primary Examiner—Edward L. Coles, Sr.
Attorney, Agent, or Firm—Ostrolenk, Faber, Gerb & Soffen

[57] ABSTRACT

In an image recording system the size of recording pixels (7) is not necessarily an integer multiple of the size of original pixel (2). A plurality of original images are combined to produce a recorded image based on the combination of the original pixels. In the process, the spatial relationship between the respective pixel arrangements of an original pixel array and a recording pixel array is detected. Based on that spatial relationship, a plurality of original pixels which surround each recorded pixel are specified and the pixel image data for the specified original pixels are interpolated to obtain each datum in the recorded pixels. This interpolation process is carried out for all recording pixels except for those recording pixels in which there is detected to occur a combination boundary of the original images.

17 Claims, 17 Drawing Sheets

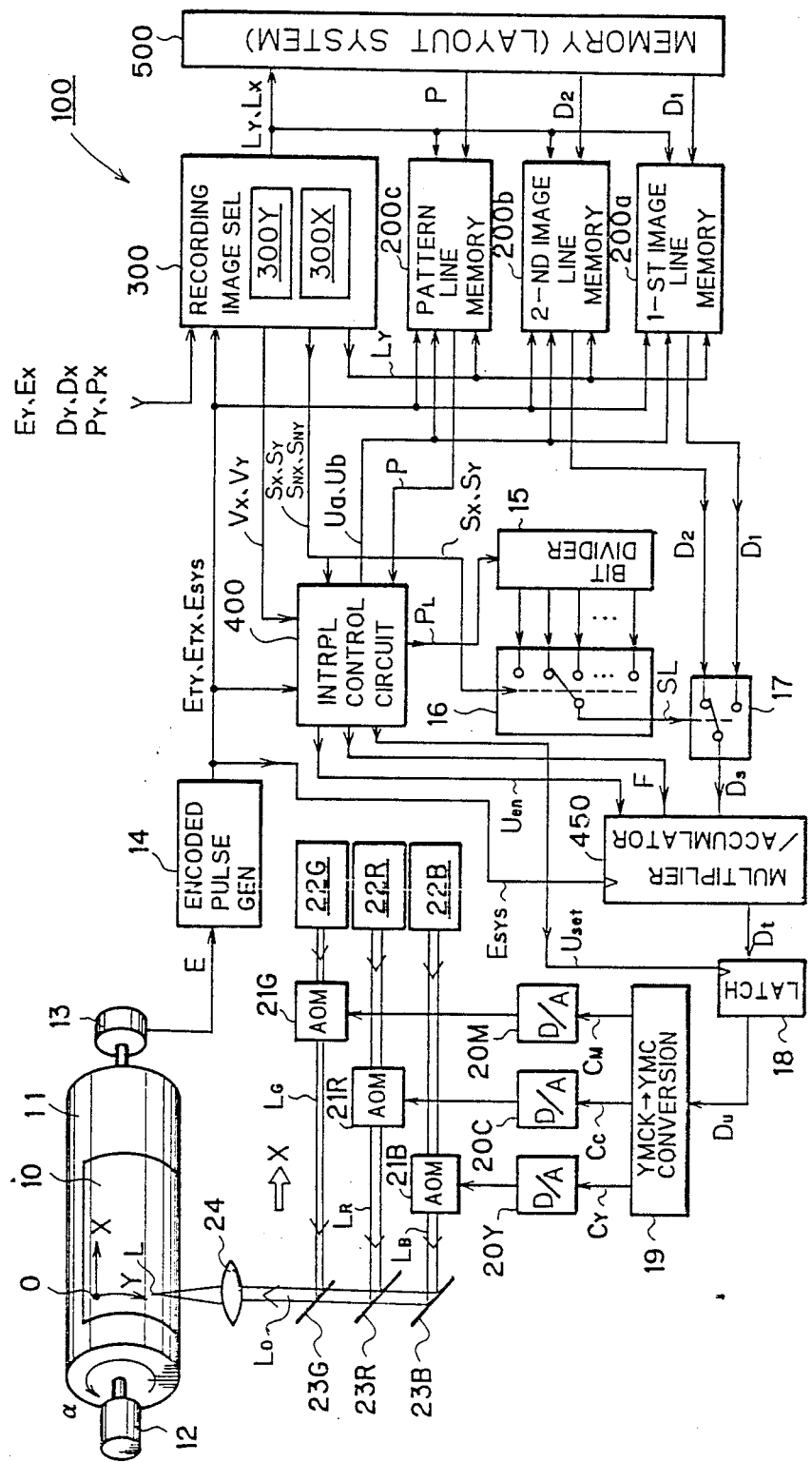

METHOD OF AND APPARATUS FOR RECORDING IMAGE IN THE FORM OF PIXEL ARRAY

BACKGROUND OF THE INVENTION

1. Field of the Invention

The present invention relates to a method and apparatus for obtaining an array of recording pixels for producing a recorded image from an original image expressed by image data for each pixel, and more particularly, to a technique of image recording which is of applicable to a case where the size of original pixels is not an integer multiple of that of the recording pixels.

2. Background

Recently, a layout system or a layout scanner for obtaining an edited image according to a desired image layout has been developed, for realizing a printing process. As is well known in the art, an edited image obtained by such a layout system is expressed by two sets of data, one of which consists of a plurality of image data expressing a plurality of original images to be edited, respectively, and the other being a pattern data expressing a combination pattern or rule through which the original images are spatially combined with each other.

On the other hand, there is a demand for an apparatus by which the edited image is recorded on a photosensitive material as a secondary color original image or a proofreading color image. Such an apparatus has been also developed, and image processing therein is conducted as follows:

As shown in FIG. 18A and FIG. 18B, a first original image data A expressing a first original image 1a for each pixel 2, and a second original image data B expressing a second original image 1b for each pixel 2 are prepared in the layout system. In the present description a pixel defined on an original image is called as "original pixel". Therefore the pixel 2 indicated in FIGS. 18A and 18B is the "original pixel" in the original image 1a or 1b. The pixel 2 in the first original image 1a and that the second original image 1b is of the same common size, which size is expressed by pixel pitches $D_Y$ and $D_X$ in the two dimensional image plane. The original pixel 2 having the pixel pitches $D_Y$ and $D_X$ is also illustrated in FIG. 19A and FIG. 19B with respect to the first and second original images 1a and 1b, respectively, where the pixel 2 is enlarged for convenience of illustration.

The combination pattern for defining a spatial combination rule for the original images 1a and 1b is expressed by a pattern data having a value for each pattern pitches $P_Y$ and $P_X$ as shown in FIG. 19C, through which a recorded image 3 shown in FIG. 18C is obtained from the original images 1a and 1b. The pattern pitches $P_Y$ and $P_X$ are smaller, i.e. have a higher resolution, than the original pixel pitches $D_Y$ and $D_X$ by the factor of an interger, respectively, that factor is five in the example of FIG. 19C. In the present invention, each smaller area defined by the pattern pitches $P_Y$ and $P_X$ is called a "unit cell 4".

The pattern data has a value of "1" or "0" for each unit cell 4, as shown in FIG. 19C. The first original image data A is employed in the unit cell 4 having the value "0", while the second original image data B is employed in the unit cell 4 having the value "1". Accordingly, when the pattern data of FIG. 19C is provided for the original pixel 2 corresponding to a pixel 2R indicated in FIG. 18C, a combined image data shown in FIG. 19D is obtained for the pixel 2 from the original image data A and B.

The combinated image obtained through the aforementioned layout system is employed in image recording in which a photosensitive material is exposed to a light beam for each scanning line. The resulting recorded image is faithful to the combined image as long as the recording pixel pitches are identical to the pattern pitches $P_Y$ and $P_X$. The respective values of the recording pixel pitchs in a main scanning direction and a sub-scanning direction are restricted to certain values in accordance with the sectional diameter of the light beam. However, if the recording pixel pitchs are different from the pattern pitchs $P_Y$ and $P_X$, i.e., if the size of the original pixel 2 is not an interger multiple of the size of the recording pixel, the following problem is caused when the conventional technique is followed.

That is, when the recording pixel pitchs $E_Y$ and $E_X$ of the recording pixel 7 shown in FIG. 20 are different from the pattern pitchs $P_Y$ and $P_X$ according to the condition indicated above, the whole size of recorded image does not match the size of the edited or combined image obtained through the layout system as long as the one-to-one correspondence is maintained between the unit cell 4 and the recording pixel 7.

Although the problem is especially serious in a case where the size of the recording pixel 7 is larger than that of the unit cell 4, the problem is also present even if the former is smaller than the latter. More particularly, when the size of the recording pixel 7 is not the inverse of an integer multiple of the unit cell size, it is impossible to assign a plurality of the recording pixels 7 to each of unit cells 4 without error, and the respective sizes of the combined image in the layout system and the recorded image cannot match each other.

On the other hand, the problem is prevented in the case where the respective sizes of the recording pixel 7 and the unit cell 4 are equal. However, the size of the recording pixel 7 should be determined so as to satisfy the condition for the optimum exposure which is required in an exposure device, and the sharpness in the recorded image is reduced when the condition for the optimum exposure is ignored and the size of the recording pixel 7 is forced to match the unit cell 4. Similarly, the size of the unit cell 4 is so determined as to satisfy the optimum condition for obtaining the combined image as desired, and therefore, it cannot be arbitrarily changed to match the recording pixel size.

Accordingly, it is difficult in practice to equalize the respective sizes of the recording pixel 7 and the unit cell 4. An improved image recording technique is need in which the recorded image is faithful to the original image data under the condition where the respective sizes of the recording pixel and the unit cell (or the recording pixel) are each set at their optimum values and, therefore, at times, differently from each other.

SUMMARY OF THE INVENTION

The present invention is directed to a method of generating an object image to be recorded on a recording plate in the form of a recording pixel array on the basis of an original image data, wherein the object image is obtained by combining a plurality of original images with each other according to predetermined pattern data expressing a combination pattern of the original images.

According to the present invention, the method comprises the steps of: (1) preparing image data expressing original images in the form of an original pixel array; (2) determining respective sizes of a recording pixel included in the recording pixel array and an original pixel included in the original pixel array; (3) detecting a spatial relationship between respective pixel arrangements of the recording pixel array and the original pixel array on the basis of the respective sizes; (4) specifying a plurality of original pixels spatially surrounding each recording pixel on the basis of the spatial relationship; (5) extracting respective pixel image data for the original pixels specified in step (4) from the original image data; (6) detecting a combination boundary between the original images; (7) interpolating the respective pixel image data to generate an interpolated pixel image data in case of not detecting the combination boundary in step (6); (8) recording an image on the recording plane for each recording pixel on the basis of the interpolated pixel image data and the pixel image data, thereby to obtain the object image on the recording plate.

Preferably, the pattern data comprises a number of combination signals corresponding to the respective recording pixels, and step (6) includes detecting the respective bits of the pattern data and comparing the same with each other, whereby it is detected whether the combination boundary exists in the original images. The existence of the combination boundary in the original images may be detected at which every combination signal of the pattern data is one of possible states.

In an aspect of the present invention, the step (7) includes the steps of: (7-1) detecting recording pixels other than recording pixels included in an exclusion distance on the basis of the spatial relationship from respective center points of the original pixels specified in step (4); (7-2) determining a coefficient function corresponding to distances between one of the center points and the respective recording pixels detected in step (7-1); (7-3) finding distances between one of the center points and respective recording pixels surrounded by the center points; and (7-4) obtaining an interpolated image data for recording pixels on the basis of the distances by using the coefficient function.

The coefficient function may include invalid values for interpolation, the invalid values being applied with recording pixels included in the excluded distance.

The present invention is also intended for an apparatus suitable for the method described above.

Accordingly, an object of the present invention is to provide a method and an apparatus for obtaining an recorded image which is faithful to a given original image data even if the ratio of the original pixel size to the recording pixel size is not an integer multiple or the inverse of an integer multiple.

Another object of the present invention is to obtain a recorded image having a predetermined size.

Further another object of the present invention is to record an image as an array of recording pixels each having a described size.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a block diagram showing the overall structure of an image recorder according to a preferred embodiment of the present invention.

DESCRIPTION OF THE PREFERRED EMBODIMENTS (A) Overall Structure of the Preferred Embodiments FIG. 1 is a block diagram showing a overall structure of an image recorder 100 according to a preferred embodiment of the present invention. The image recorder 100 receives a first original image data $D_1$, a second original image data $D_2$, and a pattern data P, all supplied from a memory 500 provided in a layout system. The first and second image data $D_1$ and $D_2$ represent the respective original images 1a and 1b shown in FIG. 18A and FIG. 18B for each original pixel 2, respectively, while the pattern data P represents a designated combination rule of the original images 1a and 1b for each original pixel 2. The combination rule is in the form of selective employment rule of the original image data $D_1$ and $D_2$. An example of the pattern data P is that shown in the pixel 2R of FIG. 19C. The image recorder 100 is operable to record a color image on a color photosensitive material 10 on the basis of the data $D_1$, $D_2$ and P, and the respective parts thereof are as follows:

(A-1) Data Processing Part

Figure 19A:
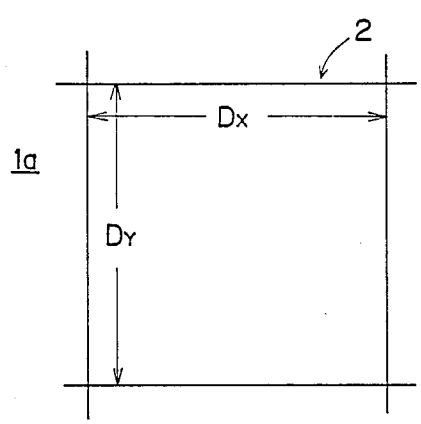
Figure 19B:
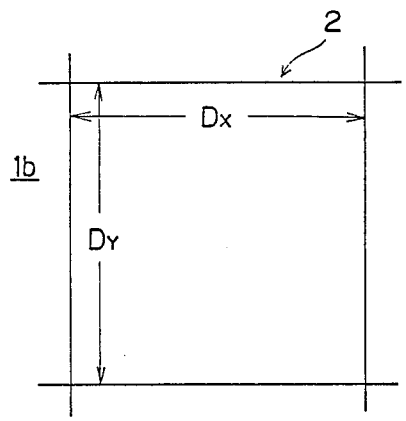
Figure 19C:
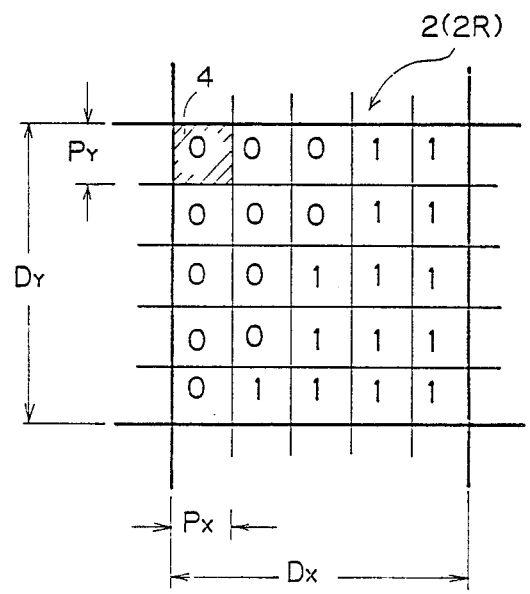
Figure 19D:
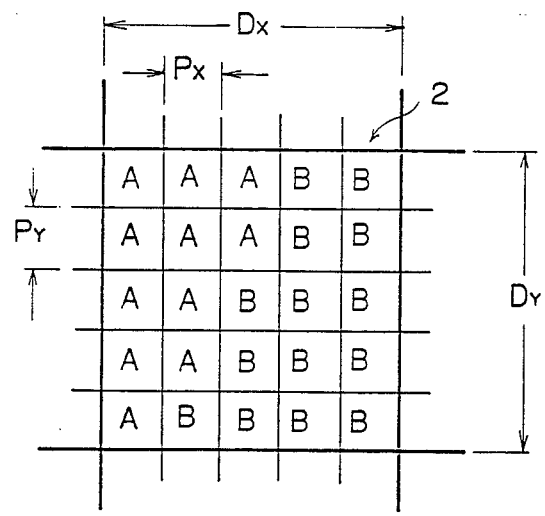

Within the data $D_1$, $D_2$ and P supplied from the memory 500, the first image data $D_1$ representing the first original image 1a for each original pixel 2 is transmitted to a first image line memory device 200a and temporarily stored therein for each scanning line. Similarly, the second image data $D_2$ representing the second original image 1b for each original pixel 2 is transmitted to a second image line memory device 200b and temporarily stored therein for each scanning line. Furthermore, the pattern data P having multi-bit values for each original pixel 2 as shown in FIG. 19C, for example, is delivered to a pattern line memory device 200c, to be stored therein for each scanning line.

The first and second original images 1a and 1b expresse represented by the first and second image data $D_1$ and $D_2$, respectively, are combined with each other according to the combination rule expressed by the pattern data P. The combination process is attained through a step in which one of the first and second original images 1a and 1b is selected through a recording image selection circuit 300 for each recording pixel defined on an image recording plane, which will be described later. The image selection circuit 300 is one of the characteristic elements in the preferred embodiment. The first and second image data $D_1$ and $D_2$ for each recording pixel are selectively employed, to be combined with that for other pixels in time series. The selection is attained through the respective switching operations in selectors 16 and 17, which will be described later.

Image data $D_s$ obtained through the selector 17 is given to a multiplier/accumulator 450. The multiplier/accumulator 450 is operable to interpolate the image data $D_s$ under the control of an interpolation control circuit 400. An interpolated image signal $D_t$ thus obtained is latched by a latch circuit 18, to become an image data $D_u$ for the image recording. The image data $D_u$ is supplied to a color conversion circuit 19.

Each of the first and second image data $D_1$ and $D_2$ includes color data for the three colors yellow (Y), magenta (M) and cyan (C), and a data for black (K), whereby the image data $D_u$ also includes the four components of Y, M, C and K. The color conversion circuit 19 converts the components Y, M, C and K into color signals $C_Y$, $C_M$ and $C_C$ for respective components of Y, M and C. Gradation corrections and other processings for the respective color are also conducted in the color conversion circuit 19.

The color signals $C_Y$, $C_C$ and $C_M$ thus obtained are further converted into analog color signals by D/A coverters 20Y, 20C and 20M, and then delivered to acoustic optical modulators (AOMs) 21B, 21R and 21G, respectively.

(A-2) Scanning Part for Exposure

Laser beams of blue (B), red (R) and green (R) generated in an Ar+ laser oscillator 22B, a He-Ne laser oscillator 22R and another He-Ne laser oscillator 22G are supplied to the AOMs 21B, 21R and 21G, respectively. The AOMs 21B, 21R and 21G modulate the laser beams in accordance with the color image signals supplied thereto, thereby generating modulated laser beams $L_B$, $L_R$ and $L_G$, respectively. The modulated laser beams $L_B$, $L_R$ and $L_G$ are reflected at half mirrors 23B, 23R and 23G into a common light path, whereby a composite exposure beam $L_0$ is obtained. The exposure beam $L_0$ is focused or projected onto the photosensitive surface of a color photosensitive material 10 through a projection lens 24, as a focused exposure beam L. The diameter d (FIG. 4) of the exposure beam L on the photosensitive surface is a factor of the recording pixel size on the photosensitive material 10.

The color photosensitive material 10 is wound around a recording drum or cylinder 11, which is rotated in the direction $\alpha$ at a constant speed with a motor 12. A main scanning of the photosensitive material 10 in the direction Y is attained by the rotation of the recording drum 11. The optical system indicated above is translationally moved along the direction X with a feeding mechanism (not shown), and therefore, a subscanning direction in exposure scanning is the direction X. The feeding mechanism is so constructed that the optical system is fed or moved by a predetermined feeding pitch at every rotation of the recording drum 11. The feeding pitch is predetermined in accordance with the diameter d of the exposure beam L, and the size of the recording pixel in the subscanning direction X is regulated by the value of the diameter d.

(A-3) Timing Signal Generating Part

Figure 20:
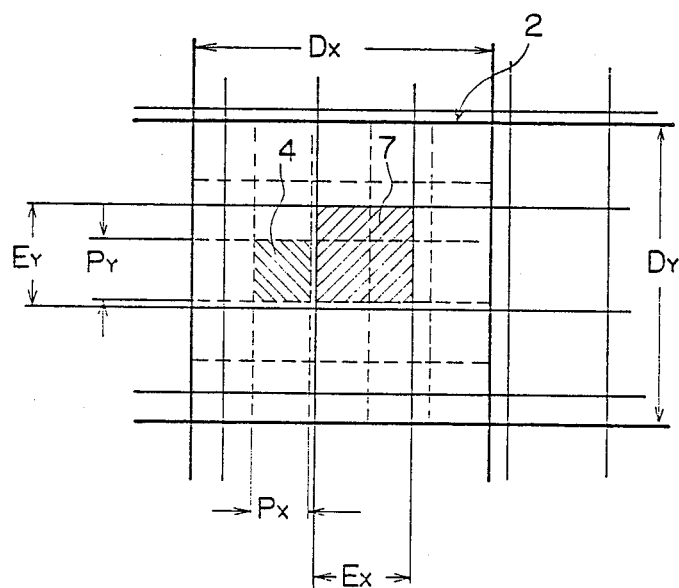

The recording drum 11 is connected to an encoder 13, which generates a pulse E every time the recording drum 11 rotates through a predetermined angle. The pulse E is counted by an encoded pulse counter 14, which generates a main scanning timing pulse $E_{TY}$ and a subscanning timing pulse $E_{TX}$ on the basis of the count of the pulse E. More particularly, the timing pulse $E_{TX}$ and $E_{TY}$ are generated every time the main scanning and the subscanning are proceeded by predetermined pitchs $E_Y$ and $E_X$ (not shown in FIG. 1), respectively. These pitches $E_Y$ and $E_X$ regulate the size of the recording pixel in the main scanning and subscanning directions, respectively, and are identical to those shown in FIG. 20.

The encoded pulse counter 14 also generates a system clock pulse $E_{SYS}$ whose pulse frequency is far higher than that of the scanning timing pulses $E_{TY}$ and $E_{TX}$. The system clock pulse $E_{SYS}$ is synchronized with the scanning timing pulses $E_{TY}$ and $E_{TX}$, and these pulses $E_{SYS}$, $E_{TY}$ and $E_{TX}$ are used in the circuits described later. It is to be noted that the scanning pulses $E_{TY}$ and $E_{TX}$ are time series signals representing the spatial array of the recording pixels defined on the photosensitive material 10.

B. Relationship between Unit Cell Size and Recording Pixel Size

Figure 2:
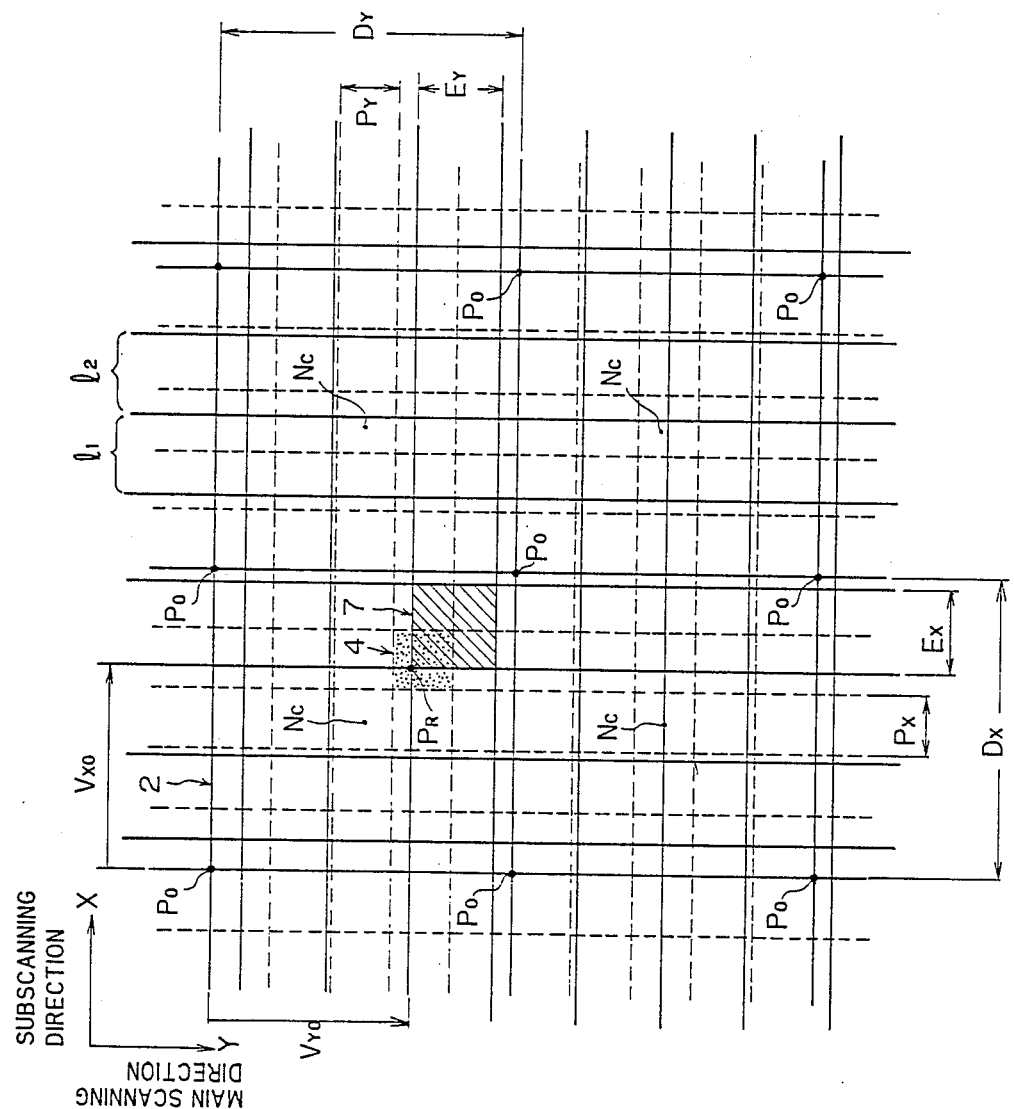
FIG. 2 is an explanatory diagram showing the spatial relationship between the respective pixel arrangements in a recording pixel array and an original pixel array.

The relationship between the respective sizes of the unit cell and the recording pixel in the preferred embodiment can be found through the following analysis:

The first and second original image data $D_1$ and $D_2$ stored in the memory 500 of the layout system have respective values expressing the first and second original images 1a and 1b for each original pixel 2, respectively. An array of the original pixels 2 is illustrated in FIG. 2 as an array of rectangular regions indicated with a lattice of thick solid lines. The size of the original pixel 2 is predetermined in the layout system, and is expressed by the respective pixel pitchs $D_Y$ and $D_X$ in the main scanning and subscanning directions, as shown in FIG. 2.

Figure 3A:
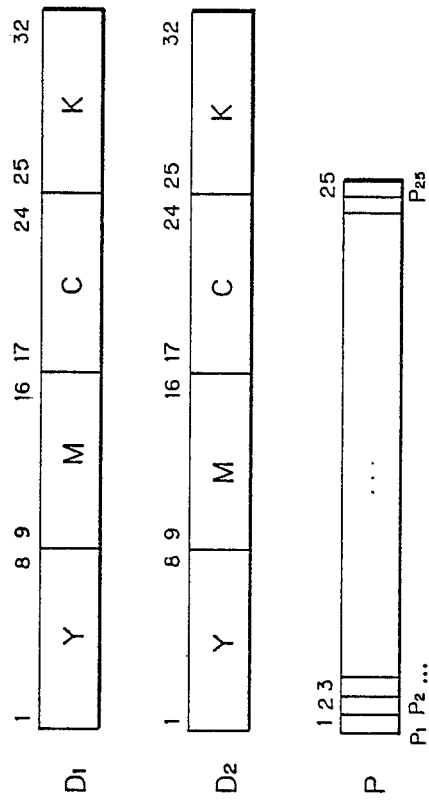
FIG. 3A is a diagram showing the respective data formats of original image data and pattern data.

On the other hand, the data format of each of the first and second image data $D_1$ and $D_2$ is as a digital data word of 32 bits as shown in FIG. 3A. Each such data word includes color density data of 8 bits for each of colors Y, M, C and K.

Furthermore, the pattern data P expressing the combination pattern of the first and second original images 1a and 1b in each original pixel 2 is a data word of 25 bits (FIG. 3A) prepared for each original pixel 2. As shown in FIG. 2, each of the original pixels 2 is devided into twenty-five unit cells 4 indicated with broken lines, and each of the unit cells 4 is associated with corresponding one bit of the pattern data P. In the example shown in FIG. 2, the twenty-five unit cells 4 comprise an array having five rows and five columns. When the i-th significant bit of the pattern data P is expressed as $P_i$ (i=1-25), the respective bits $P_i$ (i=1-25) are related to the unit cells 4 according to the rule shown in FIG. 3B. When the i-th significant bit $P_i$ is "0", it is designated that the first image data $D_1$ is selected to be used for the unit cell 4 corresponding to the bit $P_i$. On the other hand, when the bit $P_i$ is "1", it is designated that the second image data $D_2$ is selected to be used for the unit cell 4. The selection rule indicated above is the same as that explained with reference to FIG. 19C.

Since the unit cell 4 is formed by dividing the original pixel 2 into five rows in the main scanning direction Y and five columns in the subscanning direction Y, the pattern pitches $P_Y$ and $P_X$ (FIG. 2) expressing the size of the unit cell 4 in the main scanning and subscanning directions are one-fifth of the original pixel pitches $D_Y$ and $D_X$, respectively. In general, the unit cell 4 may be obtained by dividing the original pixel 2 into arbitrary number of parts, and therefore, the ratio of the pattern pitch $P_Y$ ($P_X$) and the original pixel pitch $D_Y$ ($D_X$) is $1/N_Y$ ($1/N_X$), where $N_Y$ ($N_X$) is a positive integer. The respective values of the pattern pitchs $P_Y$ and $P_X$ are also preset in the layout system.

Figure 4A:
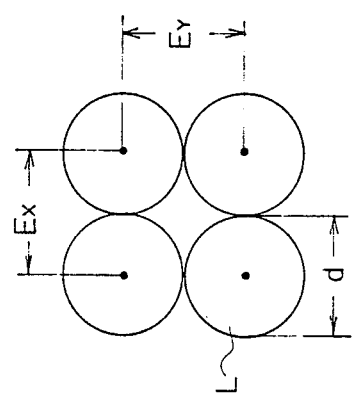
FIG. 4A and FIG. 4B show the relationship between the diameter of an exposure beam and a recording pixel pitch.
Figure 4B:
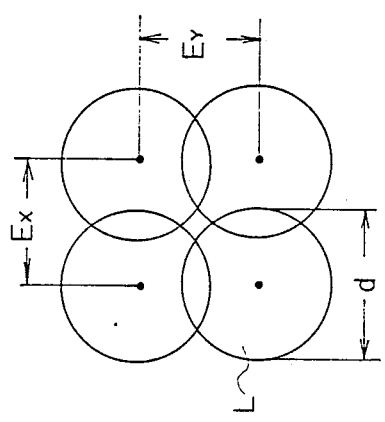

On the other hand, the size of the recording pixel 7 shown in FIG. 2 with hatching is expressed by the recording pixel pitches $E_Y$ and $E_X$ in the main scanning and subscanning directions Y and X, respectively. The recording pixel pitch $E_Y$ in the main scanning direction Y has a value corresponding to the product of the repetition interval of the main scanning timing pulse $E_{TY}$ and the rotation speed of the recording drum 11 at the circumferential surface thereof. The recording pixel pitch $E_X$ in the subscanning direction X has a value corresponding to the feeding pitch of the exposure beam $\overline{L}$ by which the exposure beam L is fed to the subscanning direction for each rotation of the recording drum 11. The recording pixel pitchs $E_Y$ and $E_X$ may be identical with the diameter d of the exposure beam L as shown in FIG. 4A, and alternatively, they may be different from the diameter d as shown in FIG. 4B. At all events, the recording pixel pitchs $E_Y$ and $E_X$ are so set that an optimum exposure is attained on the photosensitive material 10.

In the preferred embodiment, the recording pixel pitchs $E_Y$ and $E_X$ are set to be larger than the pattern pitchs $P_Y$ and $P_X$, respectively, i.e.:

$$E_Y:P_Y = E_X:P_X = 1.75:1 \tag{1}$$

Since the respective sizes of the original pixel 2 and the unit cell 4 satisfy the condition:

$$D_Y:P_Y = D_X:P_X = 5:1 \tag{2}$$

as indicated above, the relationship between the respective pitchs is expressed as:

$$E_Y:D_Y:P_Y = E_X:D_X:P_X = 1.75:5:1 = 7:20:4 \tag{3}$$

In the expression (3), the original pixel pitchs $D_Y$ and $D_X$ are not an integer multiple of, nor an inverse of an integer multiple of the recording pixel pitchs $E_Y$ and $E_X$, in the given example.

With respect to the relationship between the respective pitches in the main scanning direction and the subscanning direction, the following conditions (4) through (6) are present in the present example.

$$E_X = E_Y \tag{4}$$

$$D_X = D_Y \tag{5}$$

$$P_X = P_Y \tag{6}$$

Note that the conditions (4) through (6) are optional, i.e., the pitchs $E_Y$, $D_Y$ and $P_Y$ in the main scanning direction Y may be different from the pitchs $E_X$, $D_X$ and $P_X$ in the subscanning direction X, respectively.

Each of the pitchs $E_Y$, $E_X$, $D_Y$, $D_X$, $P_Y$ and $P_X$ has a dimension of length. However, the data processing in the present image recorder is conducted timewise, and therefore, when the quantities defined by the ratios $(E_Y/V_F)$, $(D_Y/V_F)$ and $(P_Y/V_F)$ with a main scanning speed $V_F$ of the photosensitive material 10 are regarded as new "pitches" $E_Y$, $D_Y$ and $P_Y$, respectively, each of the new pitches $E_Y$, $D_Y$ and $P_Y$ has a dimension time. The other pitches $E_X$, $D_X$ and $P_X$ in the subscanning direction X can be also converted into those having a dimension of time. Thus, all of the pitches may be regarded as quantities having a dimension of time, through the division thereof with a divisor having a dimension of speed.

C. Recording Image Selection Circuit 300

(c-1) Overall Function

Under the conditions described above, the details of the recording image selection circuit 300 are as follows. The recording image selection circuit 300 shown in FIG. 1 comprises a first circuit 300Y and a second circuit 300X corresponding to the main scanning direction Y and the subscanning direction X, respectively. The respective internal structures of the circuits 300Y and 300X are identical to each other, except for the operation timing thereof and the contents of data processed therein. Furthermore, the circuits 300Y and 300X are independently provided in the recording image selection circuit 300. Thus, although only the internal structure of the first circuit 300Y is explained with reference to FIG. 5 in the following description, that of the second circuit 300X can be easily understood by those skilled in the art through conversion of the symbol "Y" into "X" in FIG. 5.

Figure 5:
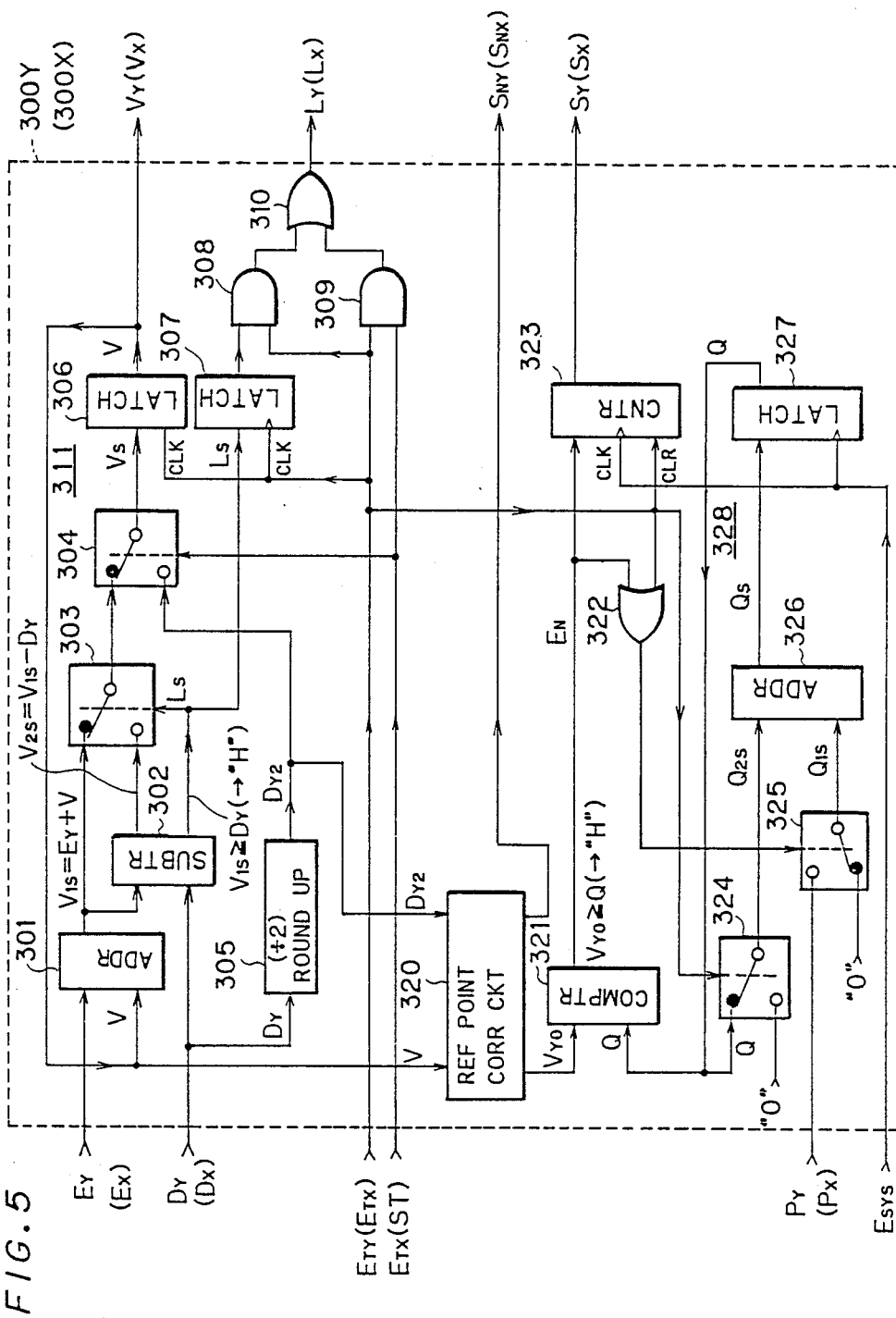
FIG. 5 is a circuit diagram showing the internal structure of a recording image selection circuit.

In accordance with a first main function of the circuit 300Y shown in FIG. 5, the circuit is a detection means for detecting the spatial ralationship between the respective pixel arrangements in the arrays of the original pixels 2 and the recording pixels 4 timewise. That is, the original pixel 2 spatially corresponding to the recording pixel 7 is specified in the circuit 300Y for each recording pixel 7, where the position of the recording pixel 7 on the image plane or the photosensitive material 10 is represented by the position of a representative point $P_R$ (FIG. 2) of the recording pixel 7. In the preferred embodiment, the representative point $P_R$ is defined by the apex of the rectangular region expressing the recording pixel 7 which is closest to the original point 0 within the four apexes of the rectangular region. Furthermore, a lattice structure 6 (FIG. 6) formed by connecting the respective center points $N_C$ of the original pixels 2 is supposed, and the original pixel 2 spatially corresponding to the recording pixel 7 is specified through the process of finding a lattice cell to which the recording pixel 7 belongs, within cells 8 defined with the lattice structure 6. The reason for employing the lattice structure 6 rather than the array of the original pixels 2 itself is that the lattice structure 6 is convenient for the interpolation which will be described later. For example, as to the recording pixel 7 illustrated in FIG. 6, four original pixels $2a-2d$ surrounding the recording pixel 7 or the representative point $P_R$ thereof at the neighbouhood of the recording pixel 7 are detected and referred to, for the selection and the interpolation of the original image data. Although it is preferred to employ the lattice structure 6 in the detection process, the array of the original pixels 2 itself may be directly referred to, without supposing the lattice structure 6.

In accordance with a second main function of the circuit 300Y, the circuit serves for detecting the unit cell 4 to which the representative point $P_R$ belongs, within the unit cells which make up the original pixel 2. This process is carried out for each recording pixel 7, by detecting the spatial relationship between the respective arrangements of the recording pixels 7 and the unit cells 4, in time series. In the detection of the unit cell 4 corresponding to the recording pixel 7, the apex $P_0$ closest to the original point 0 is employed as a reference point, within the four apexes of the rectangular region expressing the original pixel 2.

After the unit cell 4 to which the representative point $P_R$ of the recording pixel 7 belongs is detected, it is determined which of the first and second image data $D_1$ and $D_2$ is selected to be used for the recording pixel 7, with reference to the bit of the pattern data P assigned to the unit cell 4. Although the process step of referring to the pattern data P is conducted at the exterior of the circuit 300Y, a control signal for the referring step is generated in the circuit 300Y. The generation of such a control signal is a third main function of the circuit 300Y.

(c-2) Details of Structure and Operation

Referring to FIG. 5, the respective data expressing the recording pixel pitch $E_Y$, the original pixel pitch $D_Y$ and the pattern pitch $P_Y$ for the main scanning direction are supplied from a host CPU (not shown) to the circuit 300Y, where the respective values of the pitches $E_Y$, $D_Y$ and $P_Y$ are previously designated. The data for the original pixel pitch $D_Y$ is delivered to a subtractor 302 and a divider 305. The divider 305 divides the value of the original pixel pitch $D_Y$ by two, and rounds the quotient up, to generate a data $D_{Y2}$. The data $D_{Y2}$ has a value corresponding to one half of the original pixel size in the main scanning direction Y, which indicates the distance between the reference point $P_0$ (FIG. 6) and the central point $N_C$ in the main scanning direction. The data $D_{Y2}$ is transmitted to one input terminal of a selector 304, which is the normal-off terminal, indicated by a white circle. The other terminal of the selector 304 indicated by a black circle is the normal-on terminal. In other words, the input terminal indicated by the white circle is selected only when a switching signal is activated. The white/black circle rule for the selector terminals is common to all of the selectors shown in the drawings.

A recording start pulse $E_{TX}$ is given to the selector 304 as the switching or control signal thereof. In the case where FIG. 5 is the circuit 300X for the subscanning direction X rather than the circuit 300Y for the main scanning direction Y, the control signal is another recording start pulse ST. Of the recording start pulses $E_{TX}$ and ST, the former indicates a start timing of image recording for each scanning line, and the latter is generated when a power source for the motor 12 (FIG. 12) is turned on, to indicate the timing at which the image recorder is enabled for the image recording. Therefore, at the start timing of the image recording for each scanning line, the data $D_{Y2}$ is selected in the selector 304, and is latched by a latch circuit 306. Through the latching operation, a base point for starting the following steps is set at one of the reference points $P_0$ shown in FIG. 6.

On the other hand, the signal expressing the recording pixel pitch $E_Y$ is inputted to an adder 301. The combination of the adder 301, the subtractor 302, the selectors 304 and 305, and the latch circuit 306 forms a remainder calculating loop 311, in which the value of the recording pixel pitch $E_Y$ is accumulated every time a main scanning timing pulse $E_{TY}$ is generated, to give an accumulated value $V_{1S}$. The initial value in the accumulation is the value of the data $D_{Y2}$. When the accumulated value $V_{1S}$ exceeds the value of the original pixel pitch $D_Y$, a control pulse $L_S$ generated in the subtractor 302 for controlling a selector 303 is activated or raised a "H" level. In response to the activation, the remainder calculating circuit 311 fetches the value $V_{2S}$ ($=V_{1S}-D_Y$) from the subtractor 302, which is obtained by subtracting the value of the original pixel pitch $D_Y$ from the accumulated value $V_{1S}$.

Figure 6:
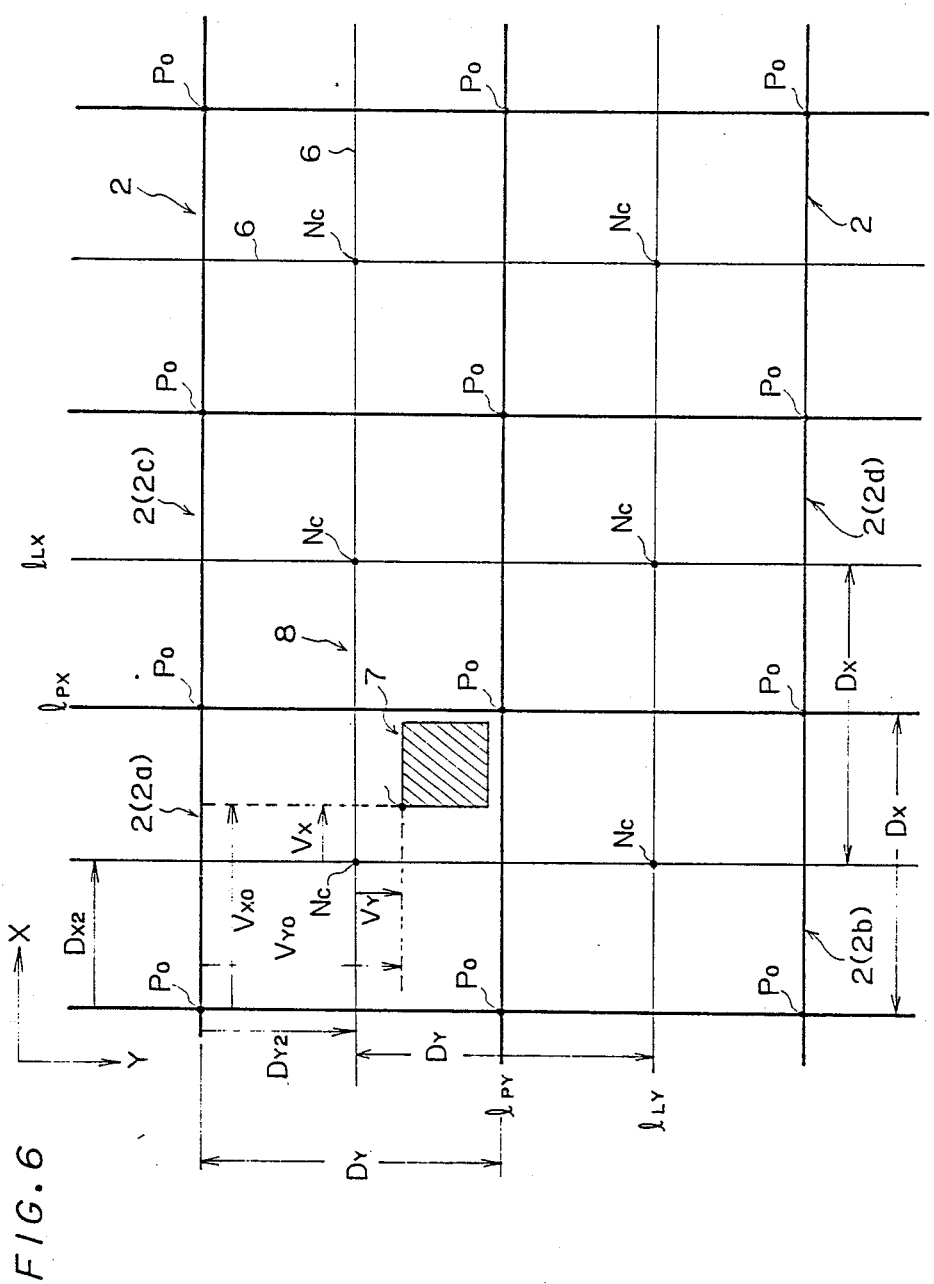
FIG. 6 is an explanatory diagram showing the spatial relationship between the respective arrangements in the recording pixel array and a lattice structure interconnecting the respective center points of the original pixels.

That is, the remainder calculating loop 311 equivalently divides the accumulated value of the recording pixel pitch $E_Y$ by the original pixel pitch $D_Y$, to obtain the remainder V of the quotient, where the initial value of the accumulated value is the value indicated by the data $D_{Y2}$. The remainder V is outputted from the circuit 300Y as a remainder $V_Y$ in the main scanning direction. As shown in FIG. 6, the remainder $V_Y$, which will be referred to as "a main scanning remainder", expresses the distance in the main scanning direction Y between the representative point $P_R$ and the center point $N_C$ of the original pixel 2 which exists at the left-top apex of the cell 8 including the representative point $P_R$.

A latch circuit 307 and gate circuits 307–310 are provided in the circuit 300Y to generate a renewal pulse $L_Y$ for renewing the first and second original image data $D_1$ and $D_2$ to be referred to at the current timing. The connection of the gate circuits 308–310 shown in FIG. 5 is such that the renewal pulse $L_Y$ is activated when:

(1) the main scanning timing pulse $E_{TY}$ and the control pulse $L_S$ are simultaneously activated, or (2) the main scanning timing pulse $E_{TY}$ and the recording start pulse ST are simultaneously activated.

Since the control pulse $L_S$ is generated every time the accumulated value $V_{1S}$ exceeds the original pixel pitch $D_Y$, the condition (1) is satisfied when the exposure scanning proceeds from the recording pixel 7 belonging to one of cells 8 shown in FIG. 6 to another recording pixel 7 belonging to the next cell. The other condition (2) is satisfied when the exposure for image recording is started at the initial time. In other words, the renewal pulse $L_Y$ expresses the spatial relationship or correspondence between the respective pixel arrangements of the recording pixels 7 and the original pixel 2.

The other elements in FIG. 5 are provided for specifying the unit cell 4 to which the representative point $P_R$ of the recording pixel 7 belongs. A reference point correction circuit 320 receives the remainder $V_Y$ and the data $D_{Y2}$, and calculates the distance $V_{Y0}$ (FIG. 6) in the main scanning direction between the representative point $P_R$ and the reference point $P_0$ neighbouring the representative point $P_R$ in the side of the recording original point 0. That is, the distance $V_Y$ between the center point $N_C$ of the original pixel 2 and the representative point $P_R$ is corrected to the distance $V_{Y0}$ between the reference point $P_0$ and the representative point $P_R$. The correction is obtained to meet the requirement where the pattern data P of the unit cell 4 to be referred to in the following steps should be specified on the basis of the positional relationship between the reference point $P_0$ and the representative point $P_R$, rather than that between the center point $N_C$ of the original pixel 2 and the representative point $P_R$. In the following description, the data expressing the distance $V_{Y0}$ is referred to as the "corrected remainder".

Figure 8:
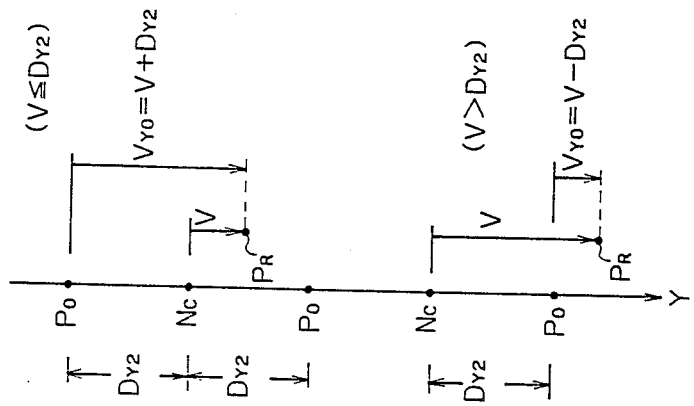
FIG. 8 is an explanatory diagram schematically showing a corrected remainder.
Figure 7:
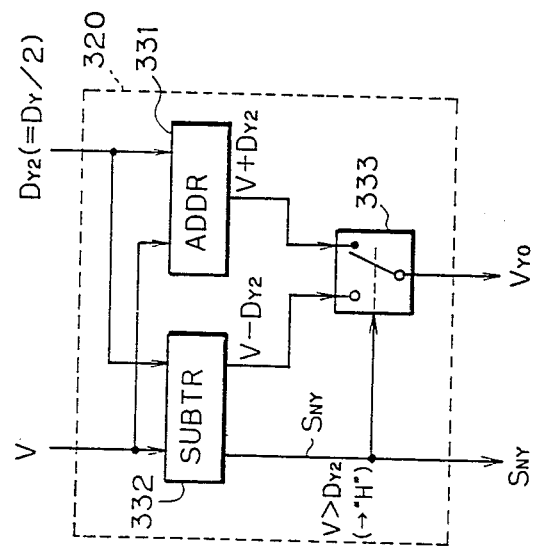
FIG. 7 is a circuit diagram showing the internal structure of a reference point correction circuit.

FIG. 7 shows the internal structure of the reference point correction circuit 320. The circuit 320 consists of an adder 331, a subtractor 332 and a selector 333. The subtractor 332 generates a signal $S_{NY}$ which is activated when the remainder V is larger than the value expressed by the data $D_{Y2}$, i.e., when the main scanning runs from a boundary line $1_{PY}$ (FIG. 6) between the original pixels 2 to a boundary line $1_{LY}$ between the cells 8. The selector 333 is controlled by the signal $S_{NY}$ according to the following rule:

That is, when the condition $V \leq D_{Y2}$ is satisfied, the data $(V+D_{Y2})$ supplied from the adder 331 is outputted through the selector 333 as the corrected remainder $V_{Y0}$. On the other hand, when the condition $V > D_{Y2}$ is satisfied, the corrected remainder $V_{Y0}$ becomes the value of $(V-D_{Y2})$ which is expressed by the output signal of the subtractor 332. The situation is schematically shown in FIG. 8, and as is understood from FIG. 8 the corrected remainder $V_{Y0}$ expresses the distance between the reference point $P_0$ and the representative point $P_R$.

The signal $S_{NY}$ is also used for specifying an original pixel and its corresponding pattern data P to be referred to, through a process of generating signals $U_a$, $U_b$ and $P_{set}$ which will be described later.

On the other hand, the pattern pitch $P_Y$ is accumulated by an accumulation loop 328 (FIG. 5) consisting of a selector 324, an adder 326 and a latch circuit 327. The accumulation is synchronized with the system clock pulse $E_{SYS}$, and therefore, it is carried and repeatedly at a high speed. In the accumulation loop 328, the selector 324 selects "0" level as its input signal, in response to the main scanning timing pulse $E_{TY}$. The main scanning timing pulse $E_{TY}$ is also supplied to another selector 325 through an OR circuit 322, whereby the selector 325 selects the signal expressing the pattern pitch $P_Y$ as its input signal. Accordingly, the output of the adder 326 becomes a level expressing the screen pitch $P_Y$ every time the main scanning timing pulse $E_{TY}$ is activated, so that the output Q of the latch circuit 327 also becomes the level of $Q=P_Y$.

The output Q is delivered to a comparator 321, to be compared therein with the corrected remainder $V_{Y0}$. The output signal $E_N$ of the comparator 321 is "H" when $V_{Y0} \geq Q$, and is supplied to the selector 325 through the OR circuit 322. Therefore, when the output Q of the accumulation loop 328 is at a level lower than the corrected remainder $V_{Y0}$, the selector 325 selects the pattern pitch $P_Y$ as its input signal. The two inputs $Q_{1S}$ and $Q_{2S}$ of the adder 326 are at $Q_{1S}=P_Y$ and $Q_{2S}=Q$ during $V_{Y0} \geq Q$, respectively, so that the accumulation loop 328 repeats the accumulation of the pattern pitch $P_Y$. A counter 323 is cleared by the main scanning timing pulse $E_{TY}$, and then counts time during which the signal $E_N$ is at "H" level, through a sampling of the signal $E_N$ which is obtained in synchronism with the system clock pulse $E_{SYS}$.

When the accumulation is repeated in the accumulation loop 328 and the condition $V_{Y0} < Q$ is satisfied, the signal $E_N$ becomes "L" and the selector 325 selects a "0" level as its input signal. The accumulation of the pattern pitch $P_Y$ in the accumulation loop 328 is then stopped, and the output Q of the accumulation loop 328 is held at the level which has been latched by the latch circuit 327 when the condition $V_{Y0} < Q$ has been satisfied for the first time. The counter 323 outputs a counted value $S_Y$ expressing the accumulation times by which the accumulation is repeated before the condition $V_{Y0} < Q$ is satisfied for the first time. In other words, supposing that the corrected remainder $V_{Y0}$ is expressed as:

$$V_{Y0} = nP_Y + r \qquad (7)$$

where n is a positive integer or zero, and r is a number satisfying $0 \leq r < P_Y$, the counted value $S_Y$ outputted from the counter 323 indicates the value n. The integer (n+1) indicates the serial number of the unit cell 4 to which the representative point $P_R$ belongs in the corresponding original pixel 2, when each of the unit cells are numbered along the main scanning direction Y. In the example shown in FIG. 2, the representative point $P_R$ is located in the unit cell 2, in the forth row. Therefore, the counted value $S_Y$ indicates the spatial relationship of the recording pixel 7 to the unit cell 4, a value which is referred to in the exposure step for the recording pixel 7.

According to the operation described above, the circuit 300 shown in FIG. 1 outputs the following data and signals:

(1) the remainders $V_Y$ and $V_X$ with respect to the main scanning direction and the subscanning direction, whose respective values are measured from the center point $N_C$ of the original pixel 2, (2) the renewal pulse $L_Y$ and $L_X$ with respect to the main scanning direction and the subscanning direction, which indicate renewal of the data for original pixel 2, to be referred to, (3) the signals $S_{NY}$ and $S_{NX}$ activated when the scanning proceeds from the boundary lines $1_{PY}$ and $1_{PX}$ of the original pixels 2 to the boundary liens $1_{LY}$ and $1_{LX}$ of the cells 8 in the main scanning direction and the subscanning direction, respectively, and (4) the counted values $S_Y$ and $S_X$ indicating the location (the row number and the column number) of the unit cell 4 to be referred to for the original pixel 2.

D. Details of Line Memory Devices 200a–200c

Each of the line memory devices 200a–20c shown in FIG. 1 has the same structure. Only the contents of data stored therein differ from each other. Therefore, only the detail of the line memory device 200a will be described with reference to FIG. 9. The structure and functions of the other line memory device 200b and 200c will be easily understood by those skilled in the art from the following description.

Figure 9:
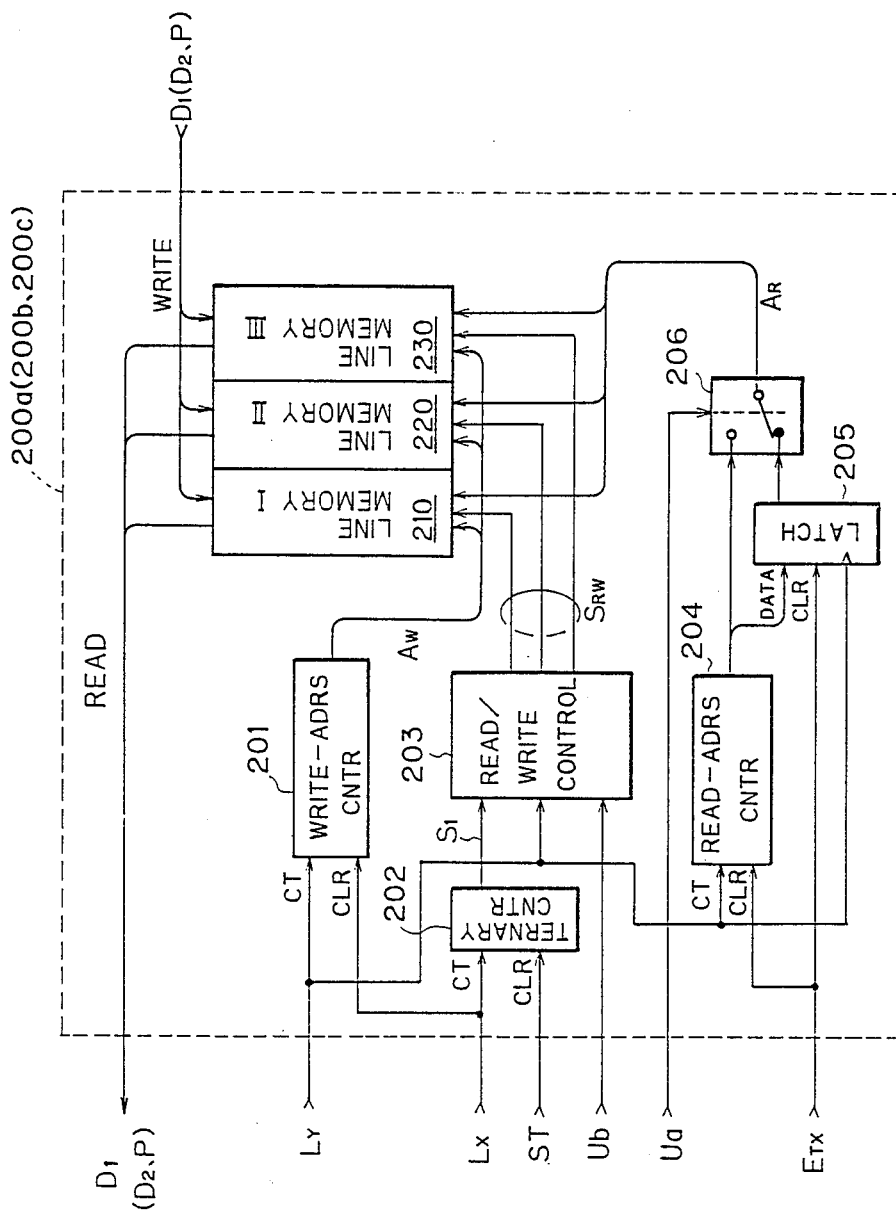
FIG. 9 is a circuit diagram showing the internal structure of a line memory device.

The line memory device 200a comprises line memories 210, 220 and 230 as shown in FIG. 9, each of which has a storage capacity for holding one scanning line of data. The line memories 210, 220 and 230 store the first image data $D_1$ supplied from the memory 500, cyclically along the spatial alignment order of scanning lines. A read/write control signal $S_{RW}$ is supplied from a read/write control circuit 203 to the line memories 210, 220 and 230. The read/write control signal $S_{RW}$ sets two of the line memories 210, 220 and 230 at their respective read-enabled states while setting the remaining one line memory at its write-enabled state. The selection of the line memories to be read-enabled or write-enabled is conducted in the order described later. The inclusion of three line memories 210, 220 and 230 is suitable for an interpolation in the subscanning direction.

When the recording start pulse ST is activated, a ternary counter 202 is cleared. The counted value $S_1$ of the ternary counter 202 is cyclically changed by one, producing the sequence "0", "1" and "2", every time the renewal pulse $L_X$ is supplied to the ternay counter 202. The counted value $S_1$ is given to the read/write control circuit 203, and the read/write control signal $S_{RW}$ is generated according to the counted value $S_1$ and the rule indicated in Table 1 in which the line memories 210, 220 and 230 are identified by the symbols "I", "II" and "III", respectively. The "H" or "L" level of a signal $U_b$ shown in FIG. 9 and Table 1 designates the line memory from which the image data $D_1$ is to be read out (of the two line memories currently in their read/enabled states a). The signal $U_b$ is generated in the interpolation control circuit 400 shown in FIG. 1, details of which will be described later, and the image data for the original pixels neighbouring each other in the subscanning direction are read out under the control of the signal $U_b$. For example, within the four pixels $2a$-$2b$ surrounding the representative point $P_R$ shown in FIG. 6, both of the original image data for the pixels $2a$ and $2c$ (or $2b$ and $2d$) can be read out in series only, by varying the level of the signal $U_b$.

TABLE 1

| $S_1$ | $U_b$ | Designation by $S_{RW}$ | |
|---|---|---|---|
| | | Write | Read |
| "0" | L | I | II |
| | H | I | III |
| "1" | L | II | III |
| | H | II | I |
| "2" | L | III | I |
| | H | III | II |

It is to be noted that the transitions between the read-enabled state and the write-enabled state in the line memories 210, 220 and 230 is synchronized with the renewal pulse $L_X$ for the subscanning direction. The state transition in the line memories 210, 220 and 230 does not occur every time the scanning for the exposure proceeds from one arbitrary scanning line $l_1$ shown in FIG. 2 to the next scanning $l_2$ and the subscanning timing pulse ED is generated. The transition between the read-enabled state and the write-enabled state occurs only when the proceeding of the scanning from the scanning line $l_1$ to the next scanning line $l_2$ is accompanied with the condition where the scanning point crosses the boundary line $l_{LX}$ between the cells 8 shown in FIG. 6 and thereby the renewal pulse $L_X$ is generated.

In other words, the original image data or pixel image data to be extracted from the first and second image data for image recording is specified in accordance with the cell 8 to which the representative point $P_R$ shown in FIG. 6 belongs.

A write-address counter 201 generates a write-address signal $A_W$ for the line memory (e.g., the line memory 210) currently in its write-enabled state. More particularly, the write-address counter 201 is cleared by the renewal pulse $L_X$ for the subscanning direction, and then counts the renewal pulse $L_Y$ for the main scanning direction to generate the write-address signal $A_W$. A read-address counter 204 is cleared by the pulse $E_{TX}$, which is activated every time the scanning for the image recording proceeds from one scanning line to another scanning line, and then counts the renewal pulse $L_Y$ for the main scanning direction, to generate a read-address signal $A_R$ for the line memories (e.g., the line memories 220 and 230) being in their respective write-enabled states. Accordingly, the original image data can be read out along the scanning line every time the scanning proceeds to a new scanning line in the subscanning direction. In the case where the scanning proceeds to the next scanning line without crossing the boundary line $l_{LX}$ (FIG. 6) between the cells 8, i.e., without generation of the pulse $L_X$, the original image data used for recording the previous scanning line is again read out from the line memory 210, 220 or 230.

Since the address signal generating circuits 201 and 204 count the renewal pulse $L_Y$ rather than the main scanning timing pulse $E_Y$, the read-address and the write-address for the line memories 210, 220 and 230 are renewed through proceeding of the scanning from one cell 8 to the next cell neighbouring the one cell 8 in the main scanning direction Y.

Within these addresses, the write-address may be generated as the value expressing the serial number of the scanning line every time the image data is read out from the memory 500 shown in FIG. 5, i.e., every time the pulse $L_Y$ is activated. On the other hand, the read-address should be generated for the original pixels neighbouring each other in the main scanning direction, since the respective pixel image data for these original pixels are required for the interpolation. For example, within the four pixels $2a$-$2b$ surrounding the representative point $P_R$ in FIG. 6, the respective read-addresses for the original pixels $2a$ and $2b$ are required for the interpolation. In order to satisfy the requirement, the read-address specified at the time when the previous renewal pulse $L_Y$ is activated is latched by a latch circuit 205 every time the renewal pulse $L_Y$ is newly activated. The current read-address and the previous read-address are given to a selector 206 in parallel, and then delivered to the line memories which are in their read-enabled states, in time series. The switching operation in the selector 206 is controlled by the signal $U_a$ supplied from the interpolation circuit 400 (FIG. 1), and the respective image data for the original pixels ($2a$ and $2b$, for example) neighbouring each other in the main scanning direction within the four original pixels surrounding the representative point $P_R$ are read out only through the control of the signal $U_a$. The process of generating the signal $U_a$ will be described later.

As a result, the original image data $D_1$ and $D_2$ and the pattern data P are written in the line memory devices $200a$, $200b$ and $200c$ along the alignment order of the scanning lines and read out from the same memory devices along the predetermined order, respectively, on the basis of the spatial relationship between the current scanning point and the cells 8 defined with the lattice structure 6 shown in FIG. 6.

Therefore, the construction described above functions as an extraction means for extracting the data for the original pixel 2 corresponding to the recording pixel 7 from the image data $D_1$ and $D_2$ and the pattern data P.

E. Detail of Interpolation Control Circuit 400

Figure 10:
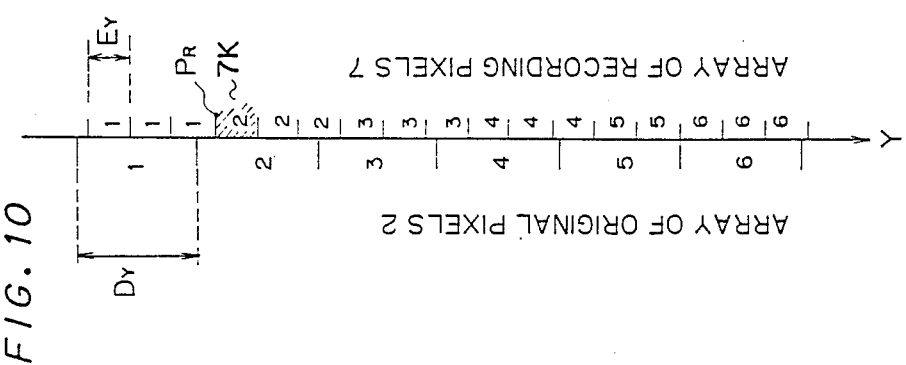

In order to clarify the character of the preferred embodiment, let it be supposed that the spatial relationship between the respective arrays of the recording pixels 7 and the original pixels 2 with respect to pixel arrangement is detected without the lattice structure 6, for image recording. The situation is schematically illustrated in FIG. 10 for the main scanning direction Y. When the original pixel 2 to which the representative point $P_R$ of the recording pixel 7K belongs is detected without the lattice structure 6 and the original image data and the pattern data for the detected original pixel 2 is referred to for the image recording, the image data and the pattern data indicated with numerals "1" through "6" for respective original pixels 2 are employed for the image recording according to the spatial corresponding relation shown in FIG. 10.

When the ratios $(D_Y/E_Y)$ and $(D_X/E_X)$ of the original pixel pitches $D_Y$, $D_X$ and the recording pixel pitches $E_Y$, $E_X$ are not integers, the spatial relationship between the original pixel 2 and the recording pixel 7 varies for every original pixel 2. It is to be especially noted that each of the data for the original pixels 2 indicated with numerals "1" through "4" and "6" is employed in three of recording pixels 7, while the data for the original pixels 2 indicated with a numeral "5" is employed only in two of the recording pixels 7. Accordingly, when the image recording is carried out on the basis of the relation shown in FIG. 10, the recorded image is partially distorted. Although the distortion is relatively small and does not cause a great problem, it is preferred to eliminate the distortion from the recorded image.

Accordingly, the preferred embodiment employs the interpolation circuit 400 and multiplier/accumulator 450 for interpolating the data as to the original pixels 2 in the image recording of the recording pixels 7. The improvement in the preferred embodiment for detecting the positional relationship between the recording pixel 7 and the original pixel 2 through the lattice structure 6 also serves for the interpolation.

As will be understood from the following description, the interpolation is conducted through the process of obtaining the exposure data for the recording pixel 7 by calculating a weighted average of the respective original image data for the original pixels 2a-2d (FIG. 11A), where the weights for the average are determined in accordance with the respective distances between the representative point $P_R$ of the recording pixel 7 and the respective center points $N_{C1}$-$N_{C4}$ of the original pixels 2a-2d surrounding the representative point $P_R$. Accordingly, when the representative point $P_R$ is located in the hatched region W (FIG. 11B) corresponding to the internal region of the cell 8, the respective image data of the four original pixels 2a-2d are used for the recording of the recording pixel 7 represented by the point $P_R$. When the representative point $P_R$ is out of the region W, another set of four pixels other than the four original pixels 2a-2d are used as will be described.

Figure 12:
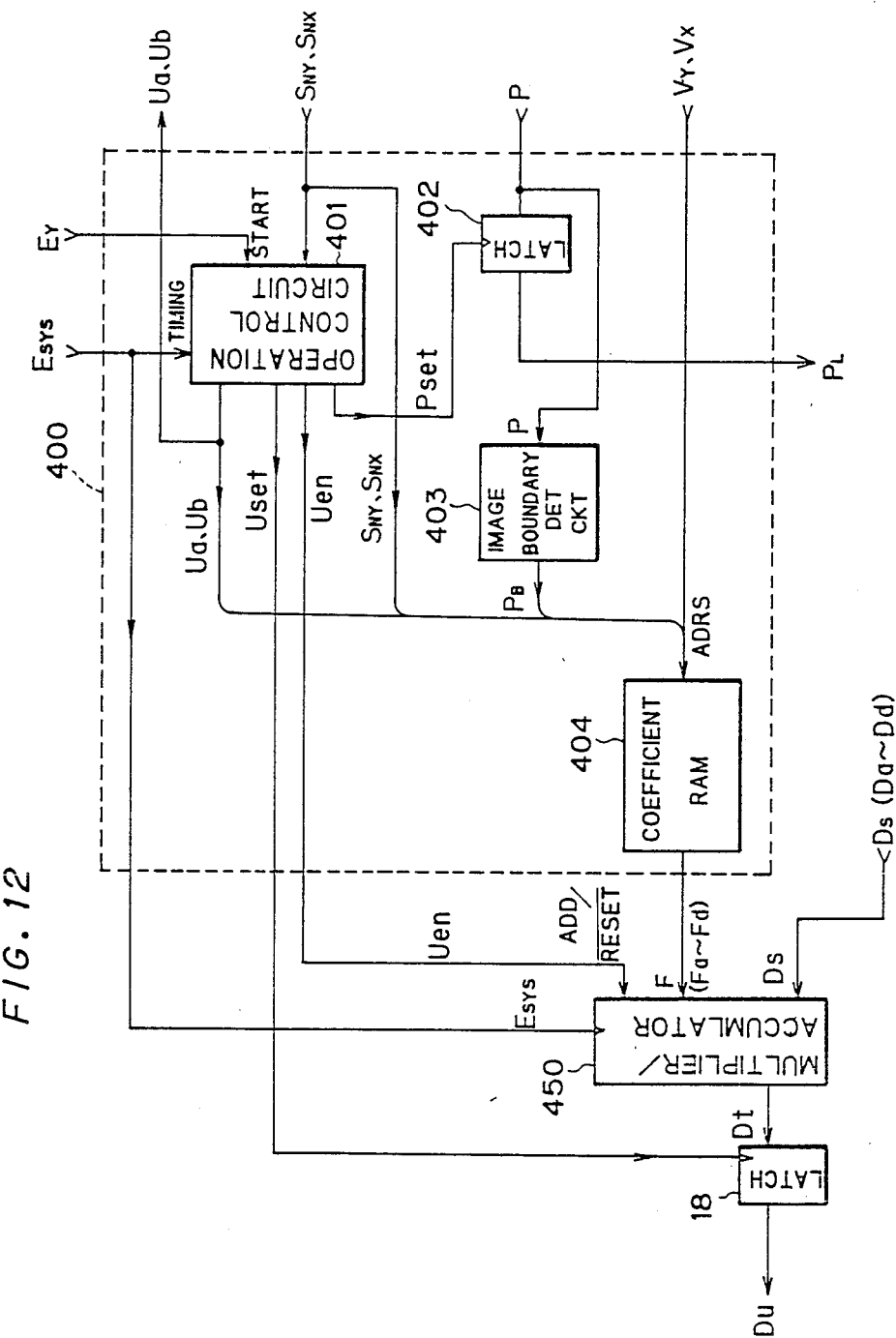
FIG. 12 is a circuit diagram showing the internal structure of an interpolation control circuit.
Figure 13:
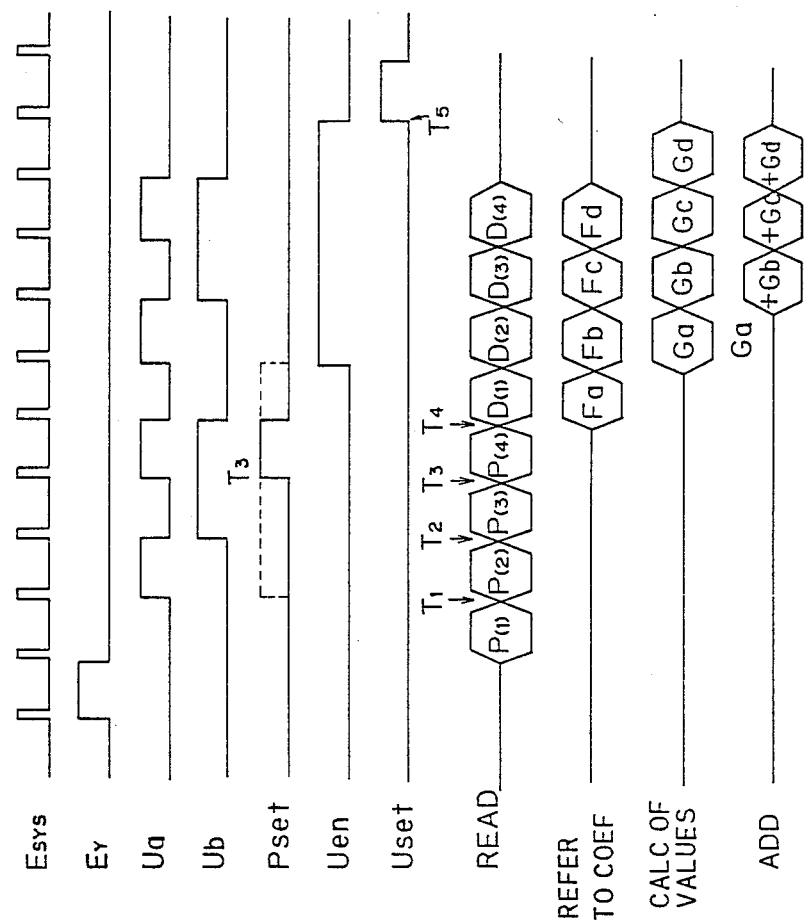
FIG. 13 is a timing chart showing the operation of the interpolation control circuit.

FIG. 12 is a block diagram showing the internal structure of the interpolation control circuit 400, and FIG. 13 is a timing chart showing the operation thereof. The interpolation control circuit 400 consists of an operation control circuit 401, a latch circuit 402, an image boundary detecting circuit 403 and a coefficient RAM 404.

When the main scanning timing pulse $E_Y$ is activated as shown in FIG. 13, the respective pattern data $P_{(1)}$-$P_{(4)}$ for the four original pixels 2a-2d (FIG. 11A) neighbouring the representative point $P_R$ are read out from the pattern line memory device 200c (FIG. 1) in synchronism with the system clock pulse $E_{SYS}$. The control signals $U_a$ and $U_b$ generated in the operation control circuit 401 are used for the read-out operation, and the reason why the signal $U_a$ and $U_b$ are used is as follows:

Since the set of the four original pixels 2a-2b extends over two columns in the original pixel array, two of the line memories (220 and 230 in FIG. 9, for example) each storing the pattern data for one scanning line should be accessed to read out the pattern data $P_{(1)}$-$P_{(4)}$ from the same. Therefore, the read/write control circuit 203 shown in FIG. 9 switches the read-out operation between the memories 220 and 230 in response to the control signal $U_b$. The selector 206 shown in FIG. 9 switches its output between the respective signals supplied from the latch circuit 205 and the read-out address counter 204 in response to the control signal $U_a$. In the example shown in FIG. 11A, the output of the selector 206 is switched between the address signal for the original pixel 2a (2c) and the other address signal for the original pixel 2b (2d). That is, the respective data for the original pixels 2a-2d stored in the line memories 220 and 230 are accessed in accordance with the rule shown in Table 2.

TABLE 2

| $U_a$ | $U_b$ | Original Pixel |
|---|---|---|
| L | L | 2a |
| H | L | 2b |
| L | H | 2c |
| H | H | 2d |

Therefore, when the control signals $U_a$ and $U_b$ are activated in the timings shown in FIG. 13, the respective pattern data $P_{(1)}$ through $P_{(4)}$ for the original pixels 2a-2d are read out in this order.

Within the pattern data $P_{(1)}$ through $P_{(4)}$, only the pattern data $P_{(3)}$ for the original pixel 2 to which the representative point $P_R$ belongs is used in the following step. Thus, the operation control circuit 401 generates a latch timing signal $P_{set}$ on the basis of the signals $S_{NY}$ and $S_{NX}$, and the pattern data $P_{(3)}$ is latched by the latch circuit 402 at the rising time $T_3$ (FIG. 13) of the latch timing signal $P_{set}$.

Figure 11A:
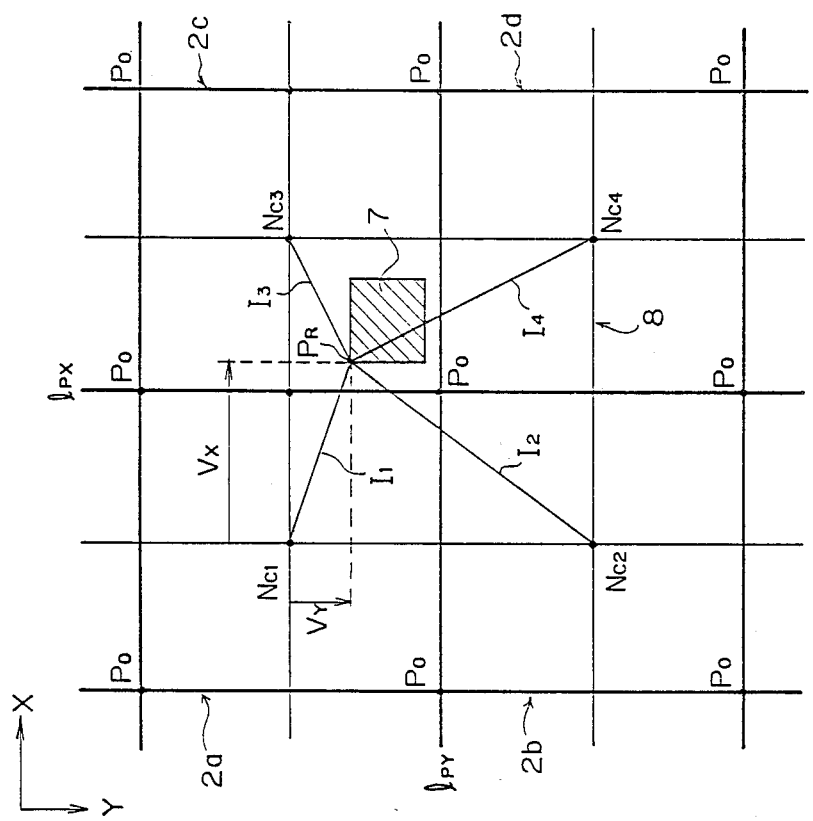
FIG. 10, FIG. 11A and FIG. 11B are explanatory diagrams showing an interpolation process.
Figure 11B:
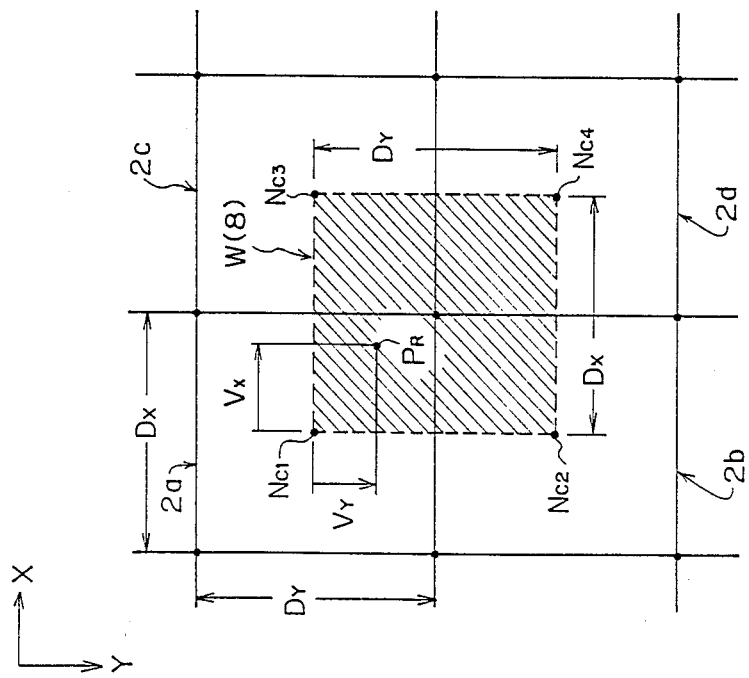

In the example shown in FIG. 11A, the representative point $P_R$ is located before the boundary line $l_{PY}$ producing a level "L" on the signal $S_{NY}$. On the other hand, the point $P_R$ is located beyond the boundary line $l_{PX}$ thereby supplying the level "H" on the signal $S_{NX}$. Accordingly, the operation control circuit 401 recognizes that the representative point $P_R$ belongs to the original pixel 2c, and the pattern data $P_{(3)}$ is latched at the timing $T_3$. If the representative point $P_R$ belongs to the original pixel 2a, 2b or 2d, the pattern data $P_{(1)}$, $P_{(2)}$ or $P_{(4)}$ is latched at the timing $T_1$, $T_2$ or $T_4$, respectively.

The pattern data P, e.g., $P_{(3)}$, latched by the latch circuit 402 is held in the same as "a latched pattern data $P_L$", until the next main scanning timing pulse $E_Y$ is activated. The latched pattern data $P_L$ is divided into image selection bits $P_1$ through $P_{25}$ for respective unit cells 4 by means of a bit divider 15 (FIG. 1), and then delivered to a selector 16.

Figure 18A:
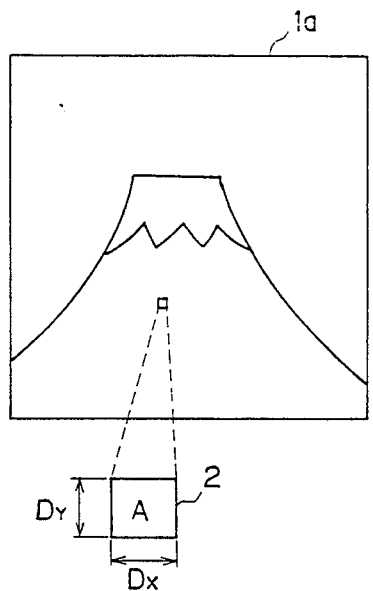
FIGS. 18A–18C, 19A–19D, and 20 are explanatory diagrams showing a combination of original images.
Figure 18B:
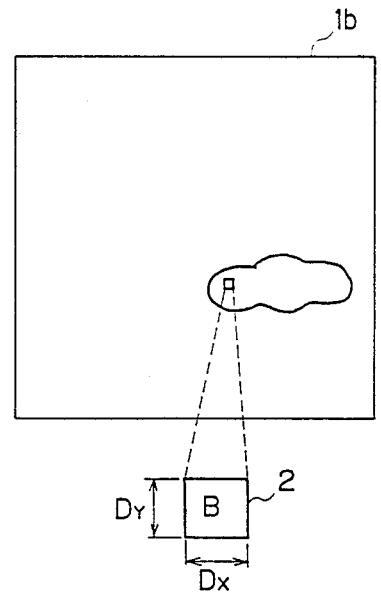
Figure 18C:
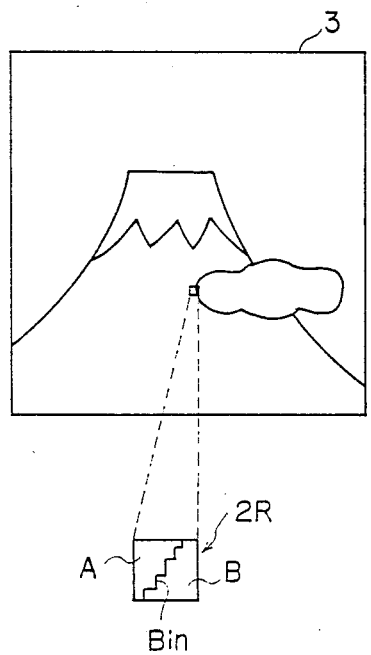

The pattern data $P_{(1)}$ through $P_{(4)}$ outputted from the line memory device 200c are also transmitted to the image boundary detecting circuit 403 (FIG. 12). The circuit 403 detects the respective bits of the pattern data $P_{(1)}$ through $P_{(4)}$ and compares the same with each other, whereby it is detected whether the image combination boundary of the first and second original images 1a and 1b (FIG. 18A and FIG. 18B) exists in any of the original pixels 2a–2d. When all of the bits of the pattern data $P_{(1)}$ through $P_{(4)}$ are "1" or all are "0", it is concluded that the image combination boundary $B_{in}$ (FIG. 18C) does not exist in any of the original pixels 2a–2d. On the other hand, if the above indicated condition is not satisfied, it is concluded that he image combination boundary $B_{in}$ exists in one or more of the original pixels 2a–2d.

The detection of the image combination boundary indicated above is required for the interpolation process since the interpolation is not carried out for the original pixel in which the image combination boundary $B_{in}$ exists (hereinafter referred to as "a boundary pixel") but is carried out for the original pixel in which the image combination boundary $B_{in}$ does not exist (hereinafter referred to as "a non-boundary pixel"). The result of the detection obtained in the image boundary detecting circuit 403 is transmitted to the coefficient RAM 404 as a boundary detection signal $P_B$.

Then, the first and second image data $D_1$ and $D_2$ are read out from the line memory devices 200a and 200b under the control of the control signals $U_a$ and $U_b$, for being delivered to the selector 17 shown in FIG. 1. In FIG. 13, the first and second image data $D_1$ and $D_2$ for the original pixels 2a–2d are represented as "image data $D_{(1)}$ through $D_{(4)}$", for convenience of illustration. For example, the image data $D_{(1)}$ represents both of the first and second image data $D_1$ and $D_2$ for the original pixel 2a.

A control signal SL for the selector 17 is generated in the other selector 16. The selector 16 has twenty-five input terminals, to which the twenty-five image selection bits $P_1$ through $P_{25}$ are supplied, respectively. The image selection bits $P_1$ through $P_{25}$ are obtained by dividing the pattern data $P_L$ (e.g., $P_{(3)}$) into its respective bits by the bit divider 15. The counted values $S_Y$ and $S_X$ obtained in the counter 323 (FIG. 5) is transmitted to the selector 16 as control data of the selector 16. As already described, the values larger than the counted values $S_Y$ and $S_X$ by one indicate the location of the unit cell 4 (the row number and the column number) to which the representative point $P_R$ belongs, within the area specified by the corresponding original pixel 2. In the preferred embodiment, each of the original pixels 2 is divided into five rows in the main scanning direction Y and five columns in the subscanning direction X, and therefore, each of the counted values $S_Y$ and $S_X$ is expressed by a data of three bits. In the example shown in FIG. 2, the counted values $S_Y$ and $S_X$ are given as $S_Y=S_X=$"3".

Figure 3B:
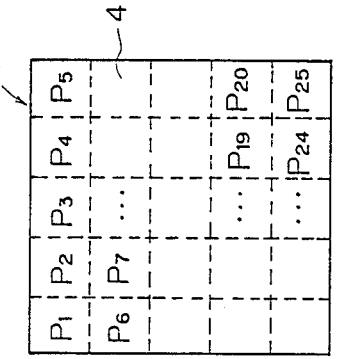
FIG. 3B is an explanatory diagram showing the division of the original pixel into unit cells.

The pattern data P selected by the selector 17 (FIG. 1) in accordance with the combination of the counted values $S_Y$ and $S_X$, which is the pattern data $P_{19}$ shown in FIG. 3B, for example, is supplied to the selector 16 as the selection control signal SL. One of the first and second image data $D_1$ and $D_2$ is selected by the selector 17 in accordance with the value (i.e., "0" or "1") of the image selection bit $P_{19}$, for being delivered to the multiplier/accumulator 450 as the image data $D_S$.

In parallel to the image selection, a coefficient $F_a$ is read out from the coefficient RAM 404 shown in FIG. 12, the coefficient $F_a$ expressing the rate at which the image data $D_a$ for the original pixel 2a is to be used in the interpolation. A coefficient table expressing the value of the coefficient $F_a$ together with the coefficients for other pixels is previously determined and stored in the coefficient RAM 404 in the form of a look up table. The address signals for the coefficient RAM 404 are the signals indicating the remainders $V_Y$ and $V_X$ for the main scanning direction and the subscanning direction, and the signals $U_a$, $U_b$, $S_{NY}$, $S_{NX}$ and $P_B$, where the signals indicating the remainders $V_Y$ and $V_X$ express the distance between the representative point $P_R$ (FIG. 1A) and the center point $N_{C1}$ of the original pixel 2. The contents of the coefficient table will be described later.

The coefficient $F_a$ (=F) outputted from the coefficient RAM 404 is delivered to the multiplier/accumulator 450, to be multiplied by the image data $D_a$ (=$D_S$) held in the multiplier/accumulator 450. The value $G_a = F_a D_a$ thus obtained is set in the multiplier/accumulator 450.

Similarly, the respective image data $D_{(2)}$ through $D_{(4)}$ for the original pixels 2b–2d are read out from the line memory devices 200a and 200b in accordance with the timing shown in FIG. 13, and selected through the selectors 16 and 17, whereby image data $D_b$ through $D_d$ are obtained. The coefficients $F_b$ through $F_d$ are read out from the coefficient RAM 404, and then multiplied by the image data $D_b$ and $D_d$ in the multiplier/accumulator 450, respectively, to provide values $G_b$ through $G_d$, which are serially added to the value $G_a$ in the multiplier/accumulator 340. The process of the addition is carried out when the control signal $U_{en}$ is active.

The data thus obtained has the value of:

$$D_t = F_a D_a + F_b D_b + F_c D_c + F_d D_d \tag{8}$$

and is an interpolated image data determined on the basis of the positional relationship between the representative point $P_R$ and the original pixel array. The image data $D_t$ is latched by the latch circuit 18 in synchronism with the latch timing signal $U_{set}$, whereby the image data $D_u$ is obtained. The image data $D_u$ is supplied to a color conversion circuit 19, and the recording pixel on the photosensitive material 10 is exposed with the laser light L according to the image data $D_u$.

The contents of the coefficient table stored in the coefficient RAM 404 are as follows. The coefficient table is so constructed as to provide the coefficient F ($F_a$ through $F_d$) according to the remainders $V_Y$ and $V_X$. Since the remaindres $V_Y$ and $V_X$ do not exceed the original pixel pitches $D_Y$ and $D_X$, respectively, the remainders $V_Y$ and $V_X$ can be expressed by the normalized parameters $H_Y$ and $H_X$ being defined as:

$$H_Y = V_Y/D_Y (0 \leq H_Y \leq 1) \tag{9}$$

$$H_X = V_X/D_X (0 \leq H_X \leq 1) \tag{10}$$

The parameter $D_Y$ and $D_X$ have the same value in the preferred embodiment, i.e., $D_Y = D_X$.

The coefficient F is so defined that it is proportional to the product of first an second distances which are defined as the respective distances between the representative point $P_R$ and the center point $NC_1$ ($NC_2$, $NC_3$ or $NC_4$) of the original pixel 2 in the main scanning direction and in the subscanning direction, respectively. According to the definition, the coefficients $F_a$ through $F_d$ are expressed as follows:

$$F_a = (1-H_Y)(1-H_X) \tag{11}$$

$$F_b = (1-H_X)H_Y \tag{12}$$

$$F_c = H_X(1-H_Y) \tag{13}$$

$$F_d = H_X H_Y \quad (14)$$

Figure 14:
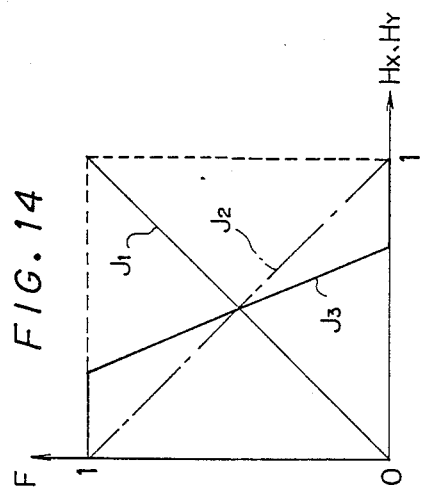
FIG. 14 and FIG. 15 are explanatory diagrams showing coefficient functions used in the interpolation and the division of a lattice cell, respectively.

FIG. 14 is a graph showing several examples of the functions (11) through (14), where a coefficient function $J_1$ shows the relation between $F_a$ and $H_X$ for the fixed value of $H_Y=0$ ($V_Y=0$), and another function $J_2$ shows the relation between $F_d$ and $H_Y$ for the fixed value of $H_X=1$ ($V_X=D_X$). As understood from the expressions (11) through (14), the coefficients $F_a$ through $F_d$ are linear functions of each parameter $H_X$, $H_Y$.

Although the coefficients $F_a$ through $F_d$ defined by the expressions (11) through (14) are not directly proportional to the lengths of segments $I_1$ through $I_4$ (FIG. 11A), respectively, they nevertheless substantially proportional to the lengths of the segments $I_1$ through $I_4$. Therefore, the expressions (11) through (14) provide good coefficients or weights for obtaining the weighted average whose weights are proportional to the respective distances between the representative point $P_R$ and the center points $N_{C1}$ through $N_{C4}$.

A coefficient function $J_3$ shown in FIG. 14 is suitable for the interpolation which is not carried out at the respective neighborhoods of the central points $N_{C1}$ through $N_{C4}$, but is carried out only for the other regions. Note that the respective values of the function $J_3$ at the neighborhood of $H_X(H_Y)=$ "0", "1" are constant values of "1" and "0", respectively. In the interpolation employing the coefficient function $J_3$, each of the cells 8 is divided into nine regions $R_0$, $R_1$-$R_4$, $R_{12}$, $R_{13}$, $R_{24}$ and $R_{34}$, where the width of the regions $R_1$-$R_4$ has a predetermined common value k.

Figure 15:
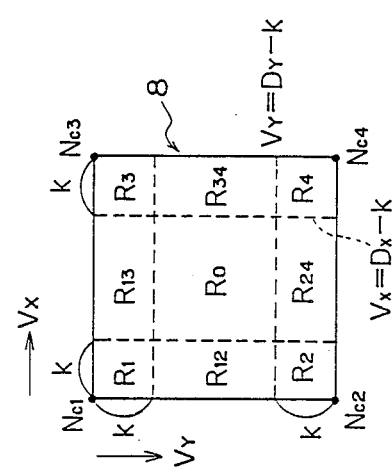

In accordance with the division of the unit cell 8 shown in FIG. 15, the coefficients $F_a$ through $F_b$ may be defined through the rule indicated in Table 3, whereby each of the coefficients $F_a$ through $F_d$ has the character corresponding to the coefficient function $J_3$. The quantities $k_Y$, $k_X$, $M_Y$ and $M_X$ indicated in Table 3 are defined as follows:

$$k_Y = k/D_Y \quad (15)$$

$$k_X = k/D_X \quad (16)$$

$$M_Y = H_Y + k_Y [=(V_Y+k)/D_Y] \quad (17)$$

$$M_X = H_X + k_X [=(V_X+k)/D_X] \quad (18)$$

When the value of the width k is made to be one half of the recording pixel pitch, for example, an interpolated image can be obtained without loss of the sharpness of the original image. The reason of which is as follows. Suppose the case where the difference in optical density or gradation between the original pixels neighboring each other on the original image is relatively large. A typical example of such an original image is a fine lattice image in which solid (the exposure rate = 100%) and vacant (0%) spots alternate. When the coefficient function $J_1$ or $J_2$, by which the weighted average is obtained for all regions, is employed, the respective gradation levels of the pixels neighboring each other is averaged in the recorded image. As a result, the gradation level or the exposure rate of the recorded image becomes about fifty percent, and the sharpness in the original image is partially lost in the recorded image.

In order to maintain the sharpness in the recorded image, the coefficient function is constructed to have a part by which the gradation level of the original pixel is faithfully reproduced in the recorded image. Since the respective values of the remainders $V_X$ and $V_Y$ vary in the unit of the recording pixel pitch, at least one recording pixel is not interpolated in each original pixel, when the value k is set at one half of the recording pixel pitch. Therefore, the coefficient function ($J_3$, for example) having a flat part or a constant part for suppressing the interpolation is meaningful in the image recording. Incidentally, the width k may have a value other than one half of the recording pixel pitch, which is previously determined according to the character of the original image. Furthermore, the parameters $k_X$ and $k_Y$ may have different values.

TABLE 3

| Region | $F_a$ | $F_b$ | $F_c$ | $F_d$ |
|---|---|---|---|---|
| $R_1$ | 1 | 0 | 0 | 0 |
| $R_2$ | 0 | 1 | 0 | 0 |
| $R_3$ | 0 | 0 | 1 | 0 |
| $R_4$ | 0 | 0 | 0 | 1 |
| $R_{12}$ | $1 - M_Y$ | $H_Y - k_Y$ | 0 | 0 |
| $R_{13}$ | $1 - M_X$ | 0 | $H_X - k_X$ | 0 |
| $R_{24}$ | 0 | $1 - M_X$ | 0 | $H_X - k_X$ |
| $R_{34}$ | 0 | 0 | $1 - M_Y$ | $H_Y - k_Y$ |
| $R_0$ | $F_a = (1 - M_X)(1 - M_Y)$ | | | |
|  | $F_b = (H_X - k_X)(1 - M_Y)$ | | | |
|  | $F_c = (1 - M_X)(H_Y - k_Y)$ | | | |
|  | $F_d = (H_X - k_X)(H_Y - k_Y)$ | | | |

As will be understood by those skilled in the art from the above description, the coefficient function can be arbitrarily determined, and it may be a curve as well as a straight line and a connected line. The coefficient table stored in the coefficient RAM 404 is previously prepared in accordance with the coefficient function, whereby a desired interpolation can be attained through the coefficient table.

The signals $U_a$, $U_b$, $S_{NY}$ and $S_{NX}$ supplied to the coefficient RAM 404 as parts of the address signals therefor are used for discriminating between the coefficients $F_a$ through $F_b$ being determined according to the expressions (11) through (14), for example.

The interpolation of the image data $D_a$ through $D_d$ with the coefficient table is carried out only when the image boundary detecting signal $P_B$ (FIG. 1) is at its non-active level and a non-boundary pixel is subjected to the exposure. When the signal $P_B$ is at its active level and a boundary pixel is subjected to the exposure, the coefficient RAM 404 outputs "1" as the coefficient ($F_c$, for example) for the original pixel designated by the signals $S_{NY}$ and $S_{NX}$, and outputs "0" for the other coefficients. The selection of the output is attained in accordance with another data previously stored in the coefficient RAM 404 in the form of a data table.

By resorting to the construction in which the interpolation is not carried out for the boundary pixel but is carried out for the non-boundary pixel, color blurring at the image combination boundary is prevented. Furthermore, since it is not necessary to prepare original images for the regions over the image combination boundary, the original images $D_1$ and $D_2$ may be prepared and stored in the memory 500 of the layout system only for the respective inside regions as far as the image combination boundary. Consequently, the amount of the image data to be processed is reduced. In other words, only one of the original image data $D_1$ and $D_2$ may be prepared for the image region on which the pattern data P has only one value, namely a "1" or "0". On the other hand, when both of the original image data $D_1$ and $D_2$ are prepared for the region over the image combination boundary, the image boundary detecting circuit 403 may be omitted.

F. Example of Recorded Image

Figure 16:
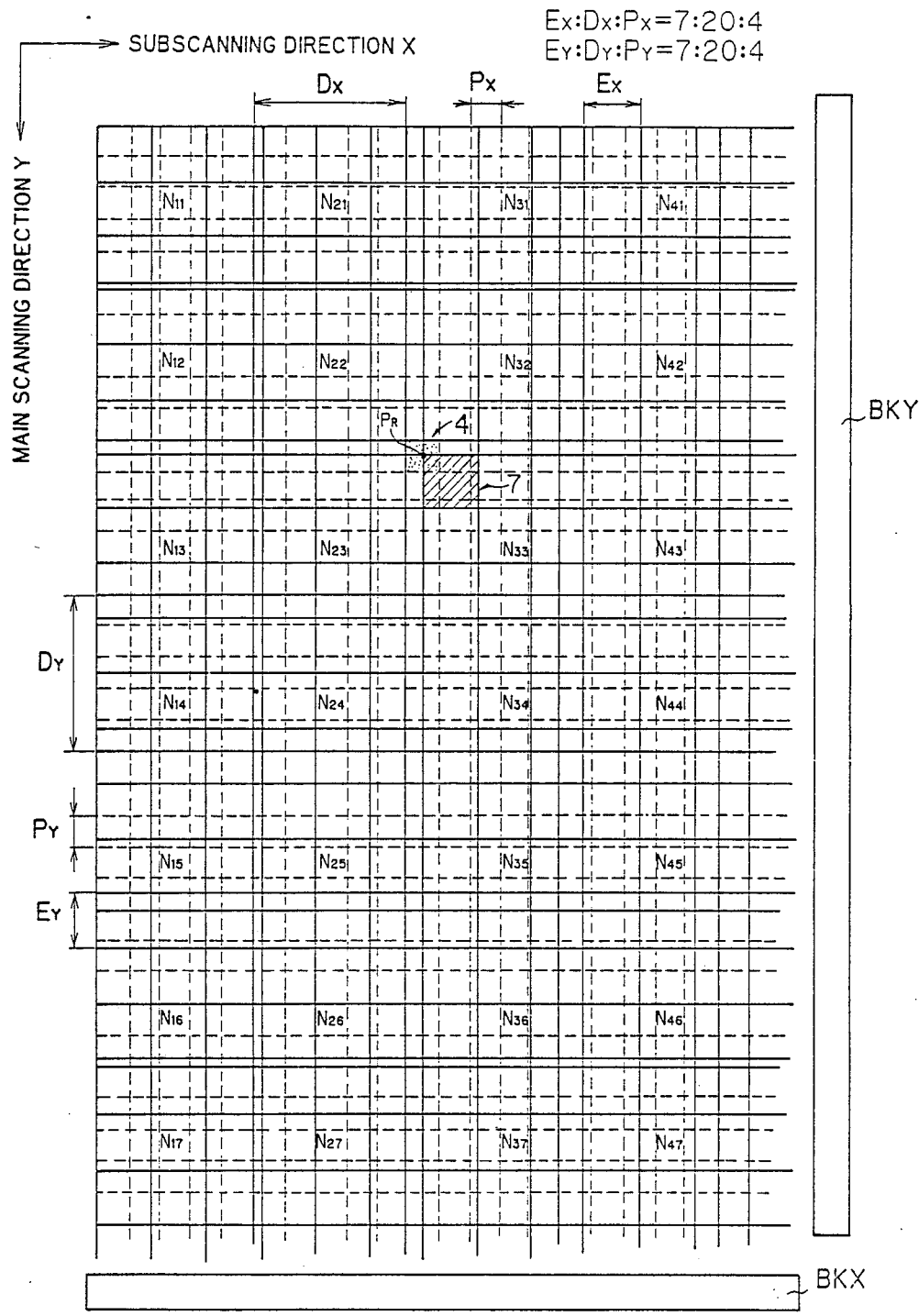
FIG. 16, FIG. 17A and FIG. 17B are diagrams showing the spatial structure of a recorded image and the generation timings of control signals.
Figure 17A:
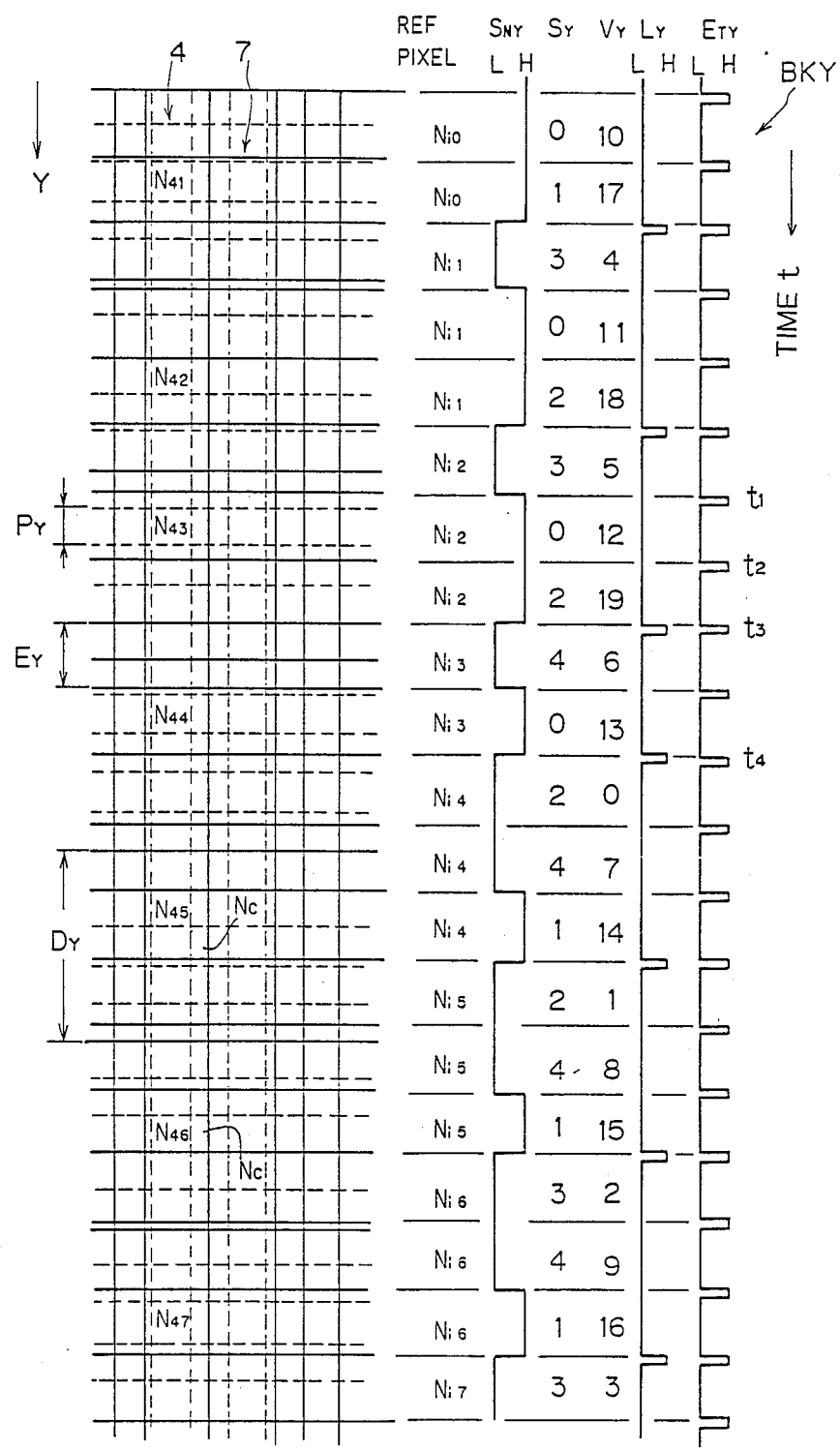
Figure 17B:
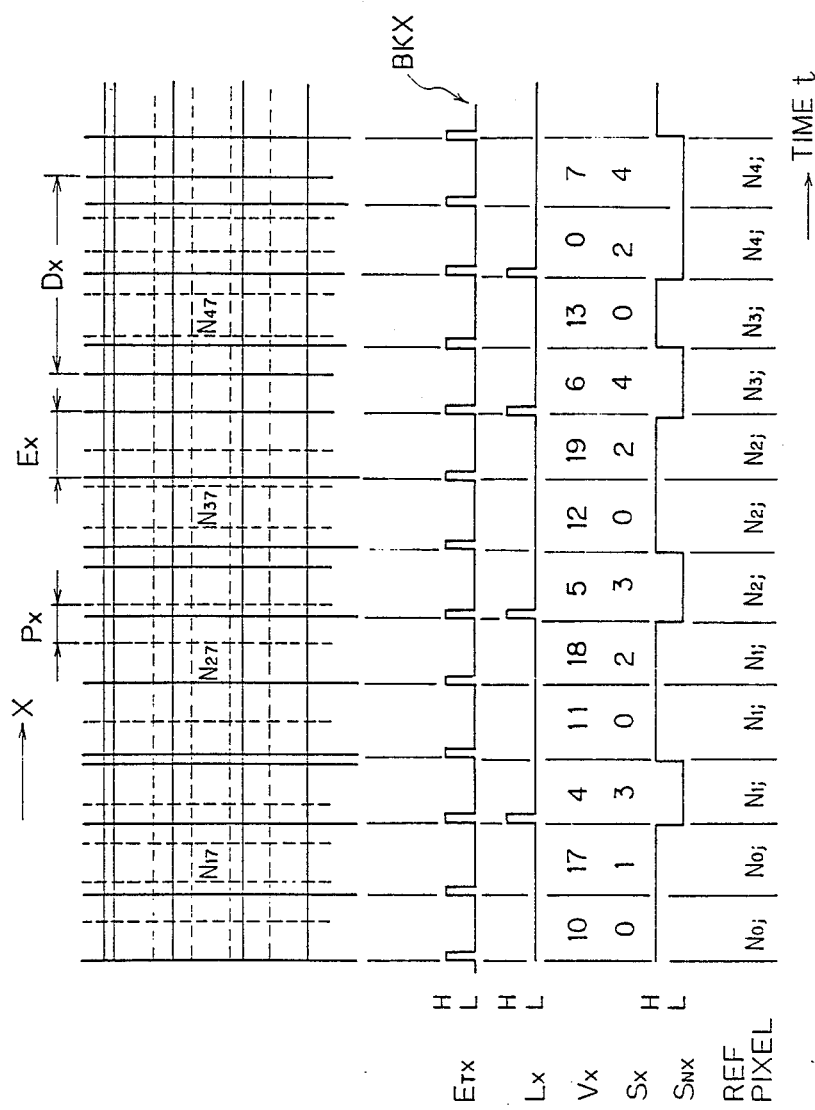

FIG. 16 is a schematic diagram showing an array of recording pixels on a recorded image which is obtained according to the preferred embodiment of the present invention. Blocks BKX and BKY shown in FIG. 16 indicate the areas on which timing charts in the image recording are to be expressed, and the contents of the blocks BKX and BKY are shown in FIG. 17A and FIG. 17B as enlarged timing charts, respectively. Furthermore, reference pixels to be referred to in the interpolation are indicated by symbols $N_{ij}$ (i.j=1,2...), in FIG. 16 and FIG. 17.

Referring to FIG. 17A, the main scanning timing pulse $E_{TY}$ is activated every time the main scanning moves ahead by the recording pixel pitch $E_Y$. Since:

$$E_Y : D_Y : P_Y = 7:20:4$$

the initial value of the remainder $V_Y$ is:

$$D_{Y2} = D_Y/2 = 10$$

Every time the main scanning timing pulse $E_{TY}$ is activated, the remainder $V_Y$ increases by $E_Y=7$. When the remainder $V_Y$ exceeds $D_Y=20$, the value $D_Y=20$ is subtracted from the remainder $V_Y$, to give a new value of the remainder $V_Y$. In the example shown in FIG. 17A, the remainder $V_Y$ changes according to the sequence of:

$$V_Y = 10.$$

$$10 + 7 = 17,$$

$$17 + 7 = 24 > 20 \rightarrow 24 - 20 = 4$$

$$4 + 7 = 11,$$

$$\ldots$$

The renewal pulse $L_Y$ is generated in synchronism with the process of subtracting the value of $D_Y=20$ from the remainder $V_Y$, whereby a reference pixel is renewed or advanced. Therefore, an original pixel $N_{i0}$ is the reference pixel for the first two recording pixels along the main scanning direction Y (FIG. 17A), and another original pixel $N_{i1}$ is the reference pixel for the next three recording pixels.

The counted value $S_Y$ indicates the number of the unit cell boundaries (the broken lines in FIG. 17A) being already crossed by the scanning after the time ($t_1$, for example) at which the main scanning timing pulse $E_{TY}$ just following the renewal pulse $L_Y$ is generated. For example, the scanning crosses two of the unit cell boundaries in the time period from $t_1$ to $t_2$, the counted value $S_Y$ at the time $t_2$ is "2". The counted value $S_Y$ is used for specifying an unit cell to be refered to.

In the section between the respective center points $N_C$ of the original pixels neighboring each other, the signal $S_{NY}$ is at "H" level before the scanning crosses the original pixel boundary which is illustrated by the thick solid line in FIG. 17A, and is at "L" level after the original pixel boundary is crossed by the scanning. The signal $S_{NY}$ is used for specifying an original pixel from which a unit cell to be referred to is extracted.

The timing chart shown in FIG. 17B is that for the subscanning direction X, and the contents of FIG. 17B will be understood those skilled in the art from the above description for FIG. 17A.

The pattern data P or the image selection bit for the unit cell 4 to which the representative point $P_R$ belongs is used for selecting a pixel image data for the recording pixel 7 (FIG. 16) from the first and second original image data $D_1$ and $D_2$. With respect to the recording pixel 7 shown in FIG. 16, the value obtained by interpolating the respective pixel image data of the four pixels $N_{22}$, $N_{23}$, $N_{32}$ and $N_{33}$ is used as an image data (an exposure data) for recording thereof.

The size of the recorded image thus obtained is the same with the image intended in the layout system. Furthermore, since the exposure data is obtained on the basis of the positional or spatial relationship between the respective arrays of the original pixels and the recording pixels, the recording image is faithful to the image being set in the layout system.

Through the interpolation process, the recording pixel 7 is recorded on the basis of the respective image data ($D_1$ or $D_2$) for the four original pixels surrounding the recording pixel 7, whereby distortion of the recorded image is prevented.

G. Modifications

The present invention can be applied to halftone dot image recording as well as to image recording with continuous exposure. The recorder may be a scanner of flat bed type, or a drum type scanner in which the inner surface of the drum is scanned.

Furthermore, the present invention may be used not only in an apparatus in which a plurality of original images are combined with each other in accordance with a pattern data, but also in an apparatus in which a single original image is reproduced.

Although the present invention has been described and illustrated in detail, it should be understood that the same is by way of illustration and example only and is not to be taken by way of limitation, the spirit and scope of the present invention being limited only by the terms of the appended claims.

What is claimed is:

1. A method of generating object data for producing therewith an object image on a recording plate, said object data being in the form of a recording pixel array which is derived from original image data, the original image data being obtained by combining a plurality of original images in accordance with a combination pattern defined by predetermined pattern data, said method comprising the steps of:

(1) providing said original image data in the form of an original pixel array which relates to the original images;

(2) determining the respective sizes of recording pixels of said recording pixel array and original pixels of said original pixel array;

(3) defining a spatial relationship existing between respective pixel arrangements of said recording pixel array and said original pixel array, on the basis of said respective sizes;

(4) specifying a respective set of original pixels for each given recording pixel, said set including original pixels of said original pixel array which spatially surround said given recording pixel and said set of original pixels being specified on the basis of said spatial relationship;

(5) extracting respective original pixel image data corresponding to said set of original pixels specified in the step (4);

(6) detecting, by reference to said combination pattern, in which of said respective sets of original pixels there occurs a combination boundary; and (7) interpolating said respective original pixel image data to generate an interpolated pixel image data for only those of said given recording pixels whose respective set of surrounding original pixels lack said combination boundary therein.

2. A method in accordance with claim 1, wherein said pattern data comprises a number of combination signals corresponding to said respective recording pixels, and said step (6) includes detecting the respective bits of said pattern data and comparing the same with each other, whereby it is detected whether said combination boundary exists in said original images.

3. A method in accordance with claim 2, wherein the existence of said combination boundary in said original images is detected at which every combination signal of said pattern data is one of several possible states.

4. A method in accordance with claim 1, wherein the step (7) includes the steps of:

(7-1) detecting further recording pixels other than recording pixels included in an exclusion distance on the basis of said spatial relationship from respective center points of said original pixels specified in the step (4);

(7-2) determining a coefficient function corresponding to distances between one of said center points and said respective recording pixels detected in the step (7-1);

(7-3) finding distances between one of said center points and respective recording pixels surrounded by said center points; and (7-4) obtaining an interpolated image data for recording pixels on the basis of said distances by using said coefficient function.

5. A method in accordance with claim 4, wherein said coefficient function includes invalid values for interpolation, said invalid values being applied with recording pixels included in said excluded distance.

6. A method in accordance with claim 1, further comprising recording an image on said recording plate for each recording pixel on the basis of said interpolated pixel image data and said pixel image data, thereby to obtain said object image on said recording plate.

7. A method in accordance with claim 6, wherein said method is used in an image recorder for generating said object image sequentially in time by scanning said recording plate along a predetermined scanning direction, and wherein said spatial relationship is detected sequentially in time along said scanning direction.

8. An apparatus for generating object image data for recording an object image on a recording plate, the object image data being in the form of a recording pixel array derived from original image data expressing an original image in the form of an original pixel array and relating to the combination of a plurality of original images according to predetermined pattern data, said object image data depending on respective sizes of recording pixels included in said recording pixel array and original pixels included in said original pixel array said apparatus comprising:

(1) input means for inputting said original image data and size data defining said respective sizes;

(2) detection means for detecting a spatial relationship between respective pixel arrangements of said recording pixel array and said original pixel array on the basis of said size data;

(3) specifying means for specifying a respective set of original pixels for each given recording pixel, said set of original pixels including original pixels which spatially surround said given recording pixel and said set being specified on the basis of said spatial relationship;

(4) extraction means for extracting respective original pixel image data for said original pixels specified by said specifying means from said original image data;

(5) interpolation means for interpolating said respective pixel image data to generate an interpolated pixel image data;

(6) boundary detection means for detecting pixels where there is a combination boundary between said original images; and (7) means for inhibiting said interpolation means from operating with respect to said pixels where said combination boundary occur.

9. An apparatus in accordance with claim 8, wherein said pattern data comprises a number of combination signals corresponding to respective original pixels, and said boundary detection means detects the respective combination signals of said pattern data and compares the same with each other, whereby it is detected whether said combination boundary exists in said original images.

10. An apparatus in accordance with claim 9, wherein said boundary detection means operates such that it concludes that said combination boundary exists in said original images at each pixel location where every signal comprising the pattern data for the pixel location is of the same state.

11. An apparatus in accordance with claim 8, wherein said interpolation means comprises:

(5-1) memory means for storing therein a predetermined coefficient function based on distances between one of center points of said original pixels specified by said specifying means and respective selected recording pixels, said selected recording pixels being recording pixels other than recording pixels included in an exclusion distance on the basis of said spatial relationship from respective center points of said original pixels specified by said specifying means;

(5-2) means for finding distances between one of said center points and respective recording pixels surrounded by said center points, and (5-3) means for obtaining an interpolated image data for recording pixels on the basis of said distances by using said coefficient function stored in said memory means.

12. An apparatus in accordance with claim 11, wherein said coefficient function includes invalid values for interpolation, said invalid values being applied with recording pixels included in said excluded distance.

13. An apparatus in accordance with claim 8, further comprising recording means for recording an image on said recording plane for each recording pixel on the basis of said interpolated pixel image data generated with said interpolation means and said pixel image data specified by said specifying means, whereby said object image is obtained on said recording plane.

14. An apparatus in accordance with claim 13, wherein said apparatus is an image recorder for generating said object image sequentially in time by scanning said recording plane along a predetermined scanning direction, and wherein said spatial relationship is detected in time series along said scanning direction.

15. A method for converting original image data to recordable image data, said original and recordable image data being respectively associated with original images and a to-be-recorded image, the method comprising the steps of:
   (a) supplying said original image data in form of an original pixel array, said original image data including data associated with at least first and second original images which are to be combined to produce said to-be-recorded image;
   (b) defining a to-be-recorded pixel array for said to-be-recorded image;
   (c) assigning a respective set of original pixels selected from said original pixel array for each pixel in said to-be-recorded pixel array;
   (d) identifying, with respect to each of said respective sets of original pixels, whether said respective set contains pixel data from both said first and second original images; and
   (e) interpolating image data of each said respective set of original pixels to obtain a corresponding data for its to-be-recorded pixel, except for those sets which have been determined to contain data which is associated with both said first and second original images.

16. A method in accordance with claim 15, further comprising defining pattern data which specifies the manner in which the first and second original images are to be combined to produce said to-be-recorded image.

17. A method in accordance with claim 16, wherein the defining step is carried out by comparing bit pattern data associated with each pixel in the original pixel array and determining that the original pixel is generated by reference to only one of said first and second original images when all the bit pattern data has the same logical value.

* * * * *